(12) United States Patent
Ferdinand

(10) Patent No.: US 12,375,338 B2
(45) Date of Patent: Jul. 29, 2025

(54) METHODS AND APPARATUS FOR USING A PHASE TRACKING REFERENCE SIGNAL WITH A SINGLE CARRIER WAVEFORM

(71) Applicant: HUAWEI TECHNOLOGIES CO., LTD., Guangdong (CN)

(72) Inventor: Nuwan Suresh Ferdinand, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/325,169

(22) Filed: May 30, 2023

(65) Prior Publication Data
US 2023/0308335 A1  Sep. 28, 2023

Related U.S. Application Data

(63) Continuation of application No. PCT/CN2020/134244, filed on Dec. 7, 2020.

(51) Int. Cl.
*H04L 27/34* (2006.01)
*H04L 27/26* (2006.01)
(Continued)

(52) U.S. Cl.
CPC ........ *H04L 27/3411* (2013.01); *H04L 27/262* (2013.01); *H04L 27/366* (2013.01); *H04L 27/38* (2013.01)

(58) Field of Classification Search
CPC . H04L 27/3411; H04L 27/262; H04L 27/366; H04L 27/38; H04L 27/2636; H04L 27/2698; H04L 27/26134
See application file for complete search history.

(56) References Cited

U.S. PATENT DOCUMENTS 11,743,899 B2 * 8/2023 Yang ............... H04W 72/21
370/329
2020/0304259 A1   9/2020 Ihalainen et al.
(Continued)

FOREIGN PATENT DOCUMENTS

CA       3062381 A1 * 11/2019 ......... H04L 1/0003
CN    110521164 A    11/2019
WO   2019194577 A1  10/2019

OTHER PUBLICATIONS

Machine translation of CN-111835669-A (Year: 2020).*
(Continued)

*Primary Examiner* — Jean B Corrielus
(74) *Attorney, Agent, or Firm* — Slater Matsil, LLP

(57) ABSTRACT

Aspects of the present application provide methods and devices for a phase tracking reference (PT-RS) scheme for use by a single carrier Offset QAM (SC-OQAM) transmitter and receiver to estimate, and correct, phase errors that occur over the communication link between the SC-OQAM transmitter and receiver. Phase errors can occur due to, for example, phase noise or carrier frequency offset (CFO). A PT-RS that includes PT-RS symbols can be used to track phase error. As a result of SC-OQAM waveform generation, real-valued PT-RS symbols may incur imaginary valued interference and imaginary-valued PT-RS symbols may incur real-valued interference. In order to effectively use the PT-RS to estimate and compensate for the phase noise, the interference must be appropriately considered.

17 Claims, 18 Drawing Sheets

(51) Int. Cl.
*H04L 27/36* (2006.01)
*H04L 27/38* (2006.01)

(56) References Cited

U.S. PATENT DOCUMENTS

2021/0168011 A1\* 6/2021 Davydov .............. H04L 5/0048
2021/0243065 A1\* 8/2021 Ferdinand ........... H04L 27/2653
2023/0006794 A1\* 1/2023 Tervo .................. H04L 27/2613

OTHER PUBLICATIONS

3GPP TS 38.211 V16.3.0, "3rd Generation Partnership Project; Technical Specification Group Radio Access Network"; NR; Physical channels and modulation (Release 16); Sep. 2020; 133 pages.
Qualcomm Incorporated; 3rd Generation Partnership Project; "Phase and frequency tracking reference signal considerations"; 3GPP TSG-RAN WG1 #89; R1-1708599; May 15-19, 2017; 7 pages.

\* cited by examiner

METHODS AND APPARATUS FOR USING A PHASE TRACKING REFERENCE SIGNAL WITH A SINGLE CARRIER WAVEFORM

CROSS REFERENCE

This application is a continuation of International Application No. PCT/CN2020/134244, filed on Dec. 7, 2020, the disclosure of which is hereby incorporated by reference in its entirety.

TECHNICAL FIELD

The present disclosure relates generally to wireless communications, and in particular embodiments, to using a phase tracking reference signal with a single carrier waveform.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

A single carrier transmission involves a single radio frequency carrier being used to carry information. Therefore, for a signal including multiple symbols, all of the symbols are transmitted in the single carrier frequency. Orthogonal Frequency Divisional Multiplexing (OFDM), on the other hand, uses multiple carrier signals at different radio frequencies. Therefore, for a signal including multiple symbols, some of the symbols are sent on each carrier frequency. Each transmission type has particular benefits, for example single carrier transmission has lower peak to average power ratio (PAPR) properties.

There are several types of single carrier waveforms. One type is known as Discrete Fourier Transform spread OFDM (DFT-s-OFDM), which is standardized in 3GPP. Another type is the more recently proposed single carrier Offset Quadrature Amplitude Modulation (SC-OQAM).

As future wireless communication standards are exploring the usage of higher frequencies to expand bandwidth to increase the capacity, one of the drawbacks in these higher frequencies is phase noise. Phase noise has been found to increases with the higher carrier frequencies. If untreated, the phase noise can result in high error rate causing poor spectral efficiency despite the use of larger bandwidths.

Therefore, mechanisms for implementing phase error estimation and phase error correction for single carrier transmission would be beneficial for communication systems.

SUMMARY

The proposed approaches should not increase the PAPR substantially, and therefore are suitable for SC-OQAM.

In some embodiments, there is provided a method involving receiving configuration information used to multiplex a phase tracking reference signal (PT-RS) with a data signal to enable detection of phase errors in a transmitted SC-OQAM signal, multiplexing the PT-RS with the data signal based on the configuration information to obtain a multiplexed signal; generating the SC-OQAM signal based on the multiplexed signal; and transmitting the SC-OQAM signal In some embodiments, using proposed PT-RS schemes allow estimation of phase noise that may occur on a SC-OQAM waveform. Correction of phase noise may enable improved block error rate (BLER) performance gain.

Aspects of the present disclosure provide a method for cancelling imaginary interference on certain PT-RS symbols, thus allowing phase noise to be estimated. Such a method involves multiplexing at least one auxiliary PT-RS symbol prior to at least one PT-RS symbol or at least one auxiliary PT-RS symbol subsequent to at least one PT-RS symbol, or both, wherein the at least one auxiliary PT-RS symbol separates the at least one PT-RS symbol from the data, wherein the at least one auxiliary PT-RS symbol separates the at least one PT-RS symbol from the data thereby avoiding interference from the data on the isolated at least one PT-RS symbol.

Aspects of the present disclosure provide a method for using known interference at the receiver to estimate phase noise. Such a method involves estimating expected values of received PT-RS symbols based on a knowledge of PT-RS symbols, auxiliary PT-RS symbols, and pulse shape filter parameters used at a transmitter and then estimating phase noise in the received SC-OQAM signal based on the estimated expected values of the received PT-RS symbols.

Aspects of the present disclosure provide a method for using zero auxiliary PT-RS symbols to remove interferences and does not depend on the data or pulse shape. Such a method involves multiplexing at least one zero value auxiliary PT-RS symbol prior to at least one PT-RS symbol or at least one zero value auxiliary PT-RS symbol subsequent to at least one PT-RS symbol, or both, wherein the at least one auxiliary zero value PT-RS symbol separates the at least one PT-RS symbol from the data thereby avoiding interference from the data on the isolated at least one PT-RS symbol.

In some embodiments, there is provided an apparatus including a processor and a computer-readable media having stored thereon computer executable instructions. The computer executable instructions, when executed, cause the apparatus to receive configuration information used to multiplex a PT-RS with a data signal to enable detection of phase errors in a transmitted SC-OQAM signal, multiplex the PT-RS with the data signal based on the configuration information to obtain a multiplexed signal; generate the SC-OQAM signal based on the multiplexed signal; and transmit the SC-OQAM signal.

In some embodiments, there is provided a method involving receiving a SC-OQAM signal generated from a multiplexed signal, wherein the multiplexed signal has been obtained by multiplexing a PT-RS and a data signal and estimating phase errors in the received single carrier orthogonal quadrature amplitude modulation (SC-OQAM) signal.

In some embodiments, there is provided an apparatus including a processor and a computer-readable media having stored thereon computer executable instructions. The computer executable instructions, when executed, cause the apparatus to receive a SC-OQAM signal comprising a multiplexed PT-RS and a data signal and estimate phase errors based on the SC-OQAM signal.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

To be able to determine phase noise in New Radio (NR), a new phase tracking reference signal (PT-RS) has been proposed for OFDM and DFT-s-OFDM communication schemes.

Figure 1A:
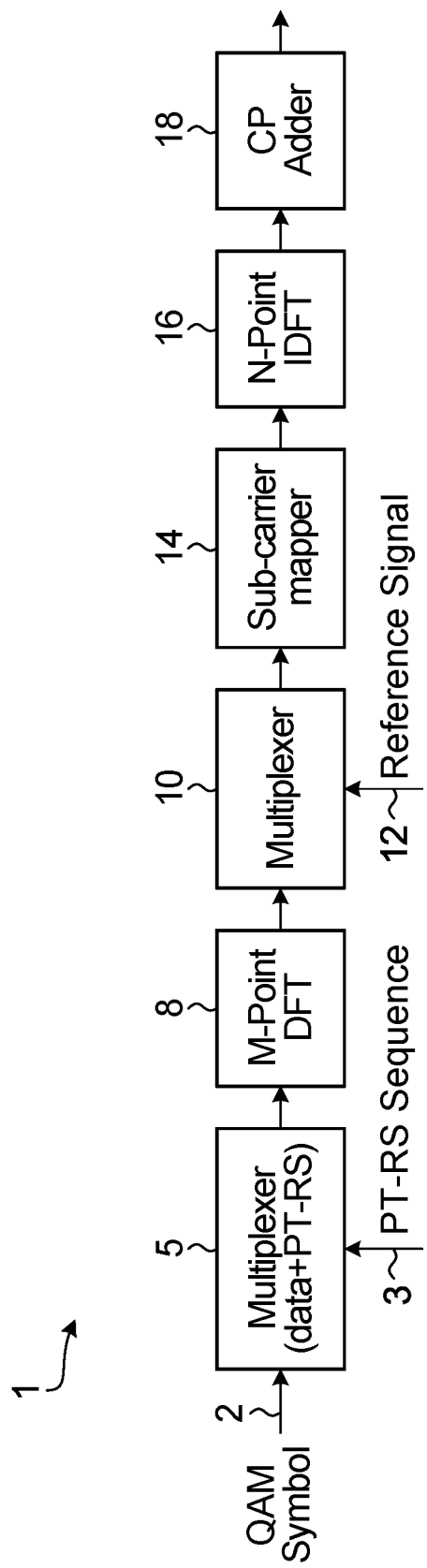
FIG. 1A is a block diagram of a DFT-s-OFDM transmitter including the use of a phase tracking reference signal.

FIG. 1A is a block diagram of a DFT-s-OFDM transmitter 1 that includes use of a PT-RS. The DFT-s-OFDM transmitter 1 includes a first multiplexer 5, an M-point Discrete Fourier Transformer (DFT) 8, a second multiplexer 10 to multiplex the output of the M-point DFT 8, a sub-carrier mapper 14, an N-point Inverse Discrete Fourier Transformer (IDFT) 16 and an cyclic prefix (CP) adder 18. In this particular example, the data is a sequence of QAM symbols. In the DFT-s-OFDM transmitter 1, a PT-RS sequence is multiplexed with a data sequence in the first multiplexer 5 before the M-point DFT 8.

Figure 1B:
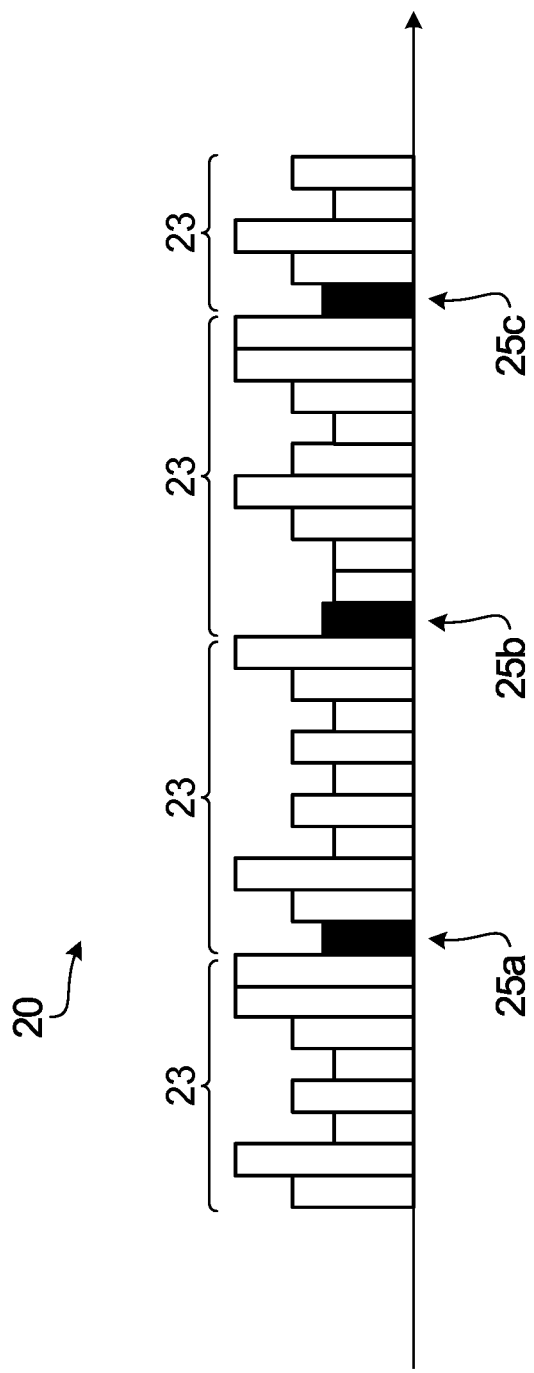
FIG. 1B is a graphical plot of a multiplexed version of data and phase tracking reference signal.

An example output of the first multiplexer 5 of the transmitter 1 is shown in FIG. 1B as a stream of symbols 20 in the time domain. Therefore, in FIG. 1B. the horizontal axis represents increasing time and the vertical axis represents amplitude. While FIG. 1B shows positive value amplitudes, it should be understood that the amplitude could be positive or negative. In the stream of symbols 20, the black symbols (represented by columns 25a, 25b and 25c) are PT-RS symbols while the white symbols (represented by columns indicated by 23) are data symbols.

Figure 1C:
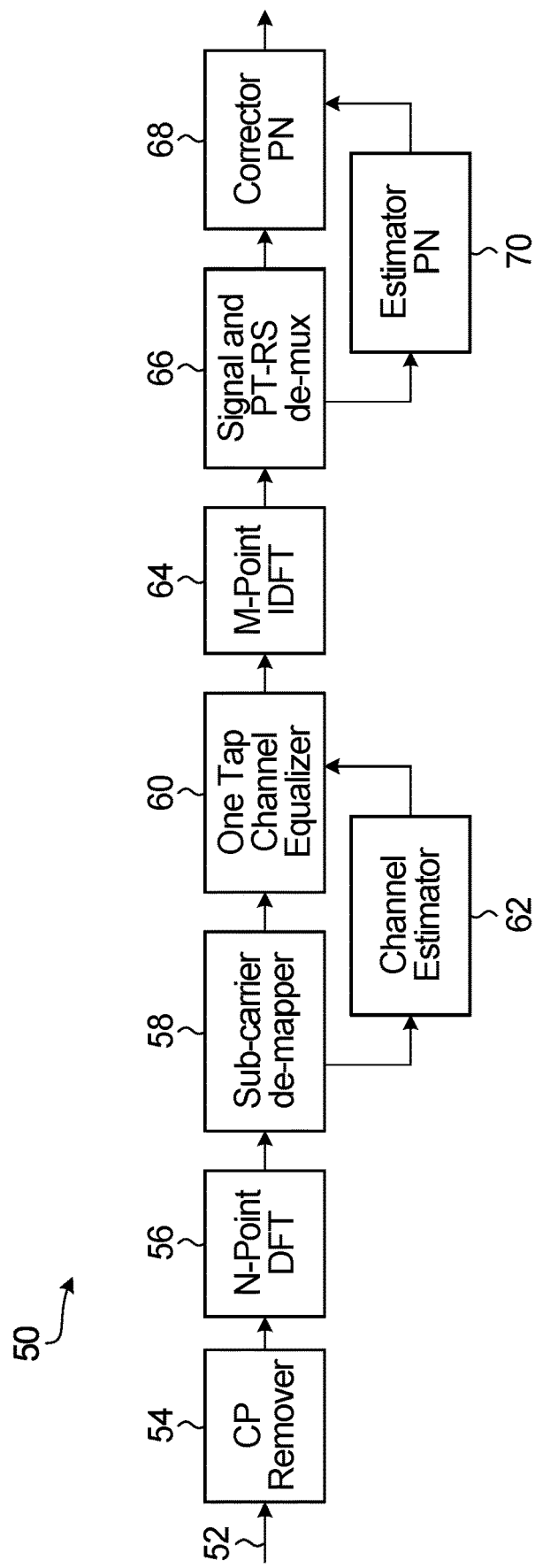
FIG. 1C is a block diagram of a DFT-s-OFDM receiver including the use of a phase tracking reference signal.

FIG. 1C illustrates a schematic diagram of a DFT-s-OFDM receiver 50. In the DFT-s-OFDM receiver 50, there is a CP remover 54 for removing the CP from a received signal 52, an N-point DFT 56 for performing an N-point DFT, a sub-carrier de-mapper 58 performing sub-carrier de-mapping, a channel estimator 62 for performing channel estimation, a one-tap channel equalizer 60 for performing one-tap channel equalization based on an output from the channel estimator 62 and an output of the sub-carrier de-mapper 58, an M-point IDFT 64 and a demultiplexer (demux) 66 to separate the data and the PT-RS. Based on an output of the demux 66, phase noise (PN) estimation can be determined by phase noise estimator 70 and phase noise correction can be performed by phase noise corrector 68 based on an output from the demux 66 and an output of the phase noise estimator 70.

Although phase noise estimation and phase noise correction are referred to specifically in the example receiver 50, a similar approach can be applied to perform other types of phase error estimation and phase error correction, such as estimation and correction of carrier frequency offset.

Figure 10:
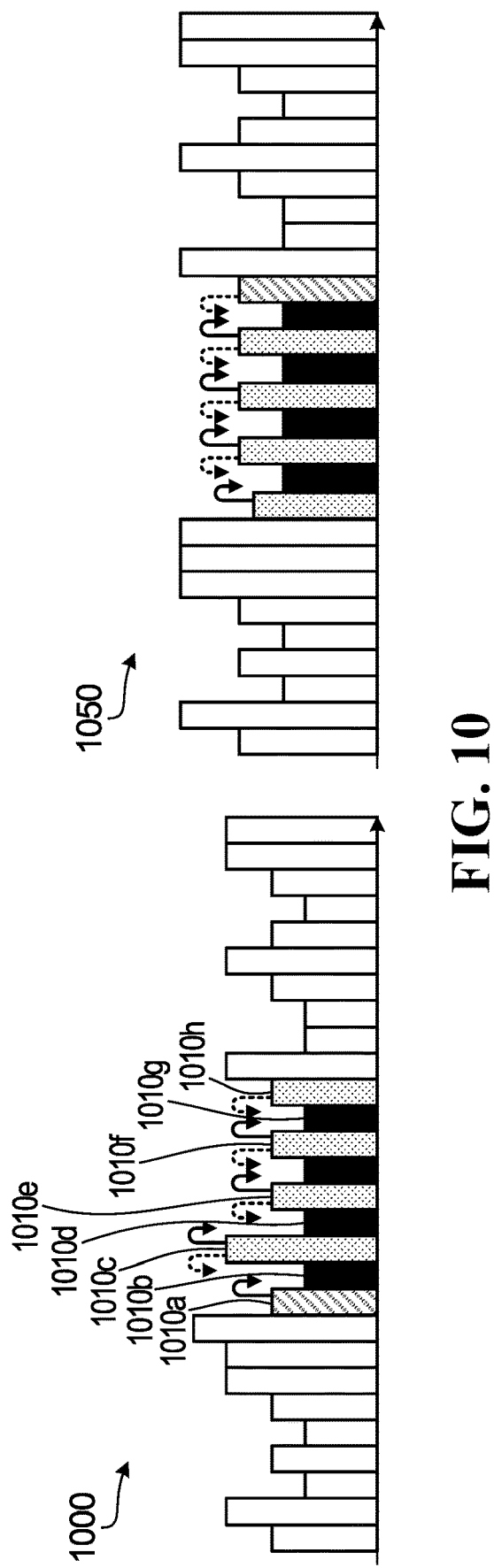
FIG. 10 illustrates two graphical plots of multiplexed versions of data and phase tracking reference signal of a SC-OQAM transmitter according to embodiments of the present disclosure.

With regard to the DFT-s-OFDM receiver 50 in FIG. 10, because subcarriers are orthogonal in the frequency domain, subsequent to the M-IDFT operation, the receiver 50 can separate the PT-RS symbols from the data symbols without any self-interference, and the PT-RS symbols can then be used for phase noise estimation. Once the phase noise is estimated, the receiver 50 can use an interpolation method to estimate phase noise on the data symbols. The receiver 50 can then mitigate phase noise on the data symbols based on the estimated phase noise.

An alternative to a DFT-s-OFDM transmission scheme is a single carrier orthogonal quadrature amplitude modulation (SC-OQAM transmission scheme). SC-OQAM features low PAPR. SC-OQAM is also a good candidate for use at higher frequencies, because the transmission scheme tolerates phase noise better than some other schemes. In order to further improve block error rate (BLER) performance, it would be a benefit to have a PT-RS scheme for SC-OQAM for when there is phase noise present.

SC-OQAM does not have orthogonality between OQAM symbols, rather it has real domain orthogonality at the receiver. That means, in SC-OQAM, real OQAM symbols are susceptible to interference from imaginary valued symbols and similarly imaginary OQAM symbols are susceptible to interference from real valued symbols. These interferences are results of neighboring symbols and pulse shaping filter. Therefore, a proposed methodology for using PT-RS for DFT-s-OFDM transmission schemes will not work for a SC-OQAM communication system as the SC-OQAM receiver would not be able to determine the resultant PT-RS symbol transmitted, which is the input PT-RS symbol plus unknown interference.

Figure 1D:
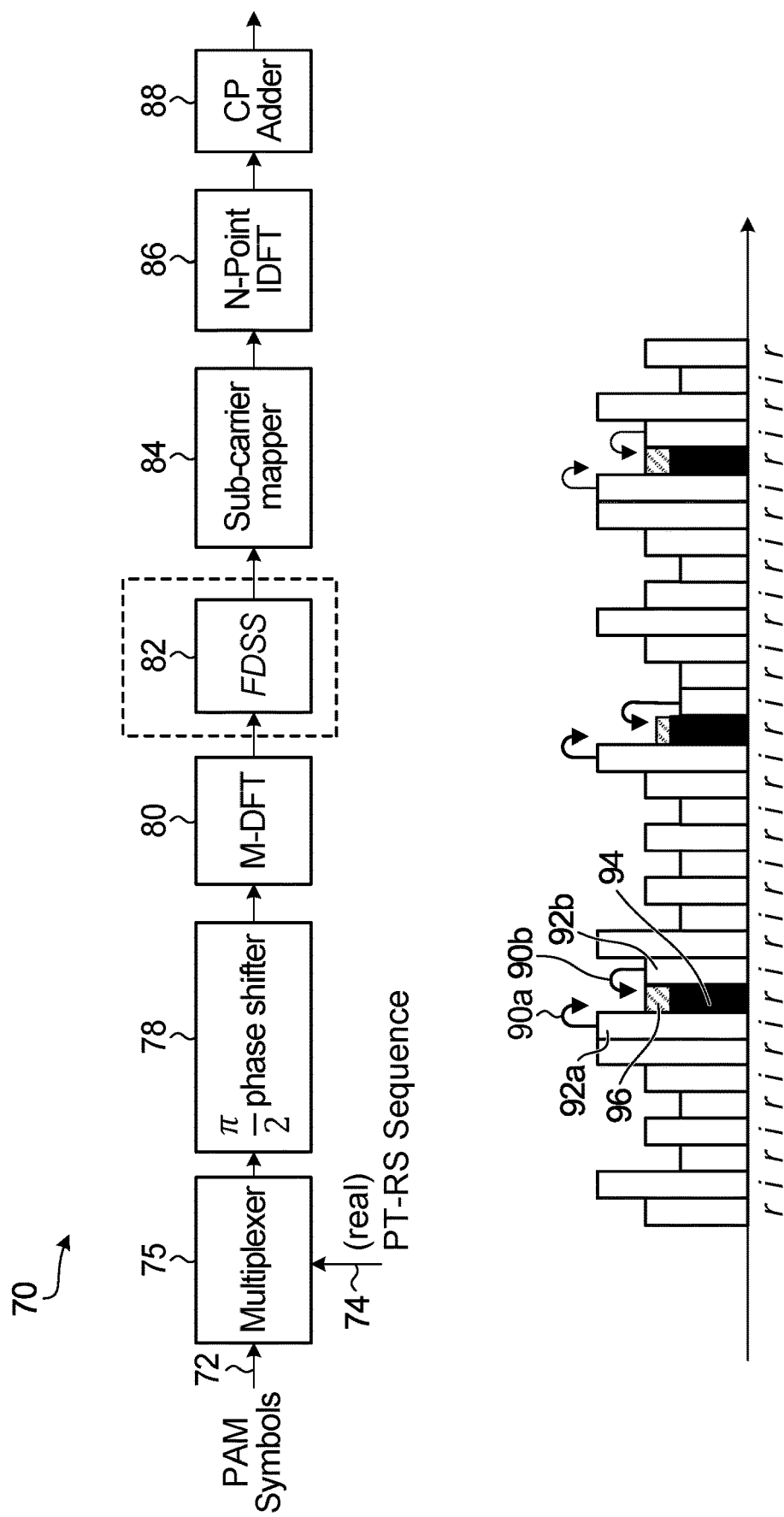
FIG. 1D is a block diagram of a single carrier offset quadrature amplitude modulation (SC-OQAM) transmitter and a graphical plot of a multiplexed version of data and phase tracking reference signal if it were to be implemented in the same manner as a DFT-s-OFDM transmitter.

FIG. 1D illustrates an example of an SC-OQAM transmitter 70 that uses PT-RS in a similar fashion to that of a DFT-s-OFDM transmission scheme. SC-OQAM transmitter 70 includes a first multiplexer 75 that can multiplex pulse amplitude modulation (PAM) symbols 72 and a PT-RS sequence 74. An output of the first multiplexer 75 is provided to a $$\frac{\pi}{2}$$

phase shifter 78. An output of the $$\frac{\pi}{2}$$

phase shifter 78 is provided to an M-point DFT 80. An output of the M-point DFT 80 is provided to a frequency domain spectral shaping (FDSS) element 82. An output of the FDSS element 82 is provided to a sub-carrier mapper 84. An output of the sub-carrier mapper 84 is provided to an N-point IDFT 86. An output of the N-point IDFT 86 is provided to a cyclic prefix (CP) adder 88.

FIG. 1D also includes a graphical plot of a multiplexed sequence of symbols output from the first multiplexer 75 and then output from the $$\frac{\pi}{2}$$

phase shifter 78. The $$\frac{\pi}{2}$$

phase shifter 78 shifts every other symbol by a $$\frac{\pi}{2}$$

resulting in a sequence of alternating real and imaginary valued symbols. Once the PAM symbols, together with PT-RS symbols, are phase shifted by $$\frac{\pi}{2}$$

phase shifter 78, these symbols are referred to as OQAM symbols. The horizontal axis in FIG. 1D is time. The FDSS element 82 that performs spectral shaping may cause imaginary interference when the OQAM data symbols and the PT-RS sequence are real-valued or may cause real interference when the OQAM data symbols and the PT-RS sequence are imaginary valued. The "r" and "i" below the individual symbols are to indicate real and imaginary symbols. In the illustration of FIG. 1D, the black columns are real valued PT-RS symbols and the white columns are real-valued and imaginary-valued data symbols. In proximity to the first PT-RS symbol 94, the arrows 90a, 90b pointing from adjacent imaginary valued symbols 92a, 92b, respectively, to the real valued PT-RS symbol 94, add an interference component 96 to the real valued PT-RS symbol 94. While the black columns are shown to real valued PT-RS symbols in FIG. 1D, as described previously above, the PT-RS symbols can alternatively be imaginary values.

The corresponding time domain operation to that of the spectral shaping in the frequency domain performed by the FDSS element 82 is a filtering operation. A filter having a filter length equal to 3 may be represented as $f_0+f_1D+f_{-1}D^{-1}$. In the case of a OQAM signal that is comprised of real-valued symbols, i.e. $f_0$ is a real valued symbol, the neighboring values of $f_{-1}$ and $f_1$ generate imaginary interference on the real-valued symbol at $f_0$. In the case of a raised cosine (RC) filter with $\alpha=1$, the filter expression can be represented as $1+0.5\ D+0.5\ D^{-1}$.

If PT-RS symbols are used in the same manner of phase error estimation and correction as the Pre-DFT PT-RS scheme described with reference to FIGS. 1A, 1B and 1C above, there occurs a resulting interference of PT-RS symbols and the data as shown in FIG. 1D. A receiver (not shown) receiving the output of transmitter 70 is not able to correctly estimate phase error as the PT-RS symbols may have an additional unknown interference. Therefore, the Pre-DFT PT-RS scheme used for the DFT-s-OFDM transmission scheme cannot be used for a SC-OQAM transmission scheme to track phase errors and correct phase errors. An alternative arrangement for using PT-RS for a SC-OQAM transmission scheme is proposed below.

Aspects of the present disclosure provide a PT-RS scheme for use by a SC-OQAM transmitter and receiver to estimate, and correct, phase errors that occur over the communication link between the SC-OQAM transmitter and receiver. Phase errors can occur due to, for an example, phase noise or carrier frequency offset (CFO). A signal that includes PT-RS symbols can be used to determine phase error. As a result of SC-OQAM waveform generation, real-valued PT-RS symbols may incur imaginary valued interference and imaginary-valued PT-RS symbols may incur real-valued interference. In order to effectively use the PT-RS to estimate and compensate for the phase noise, the interference must be appropriately considered. In some embodiments, the proposed PT-RS scheme maintains or improves BLER performance of a SC-OQAM communication system when phase noise, or any other types of phase error, is present.

Figure 2:
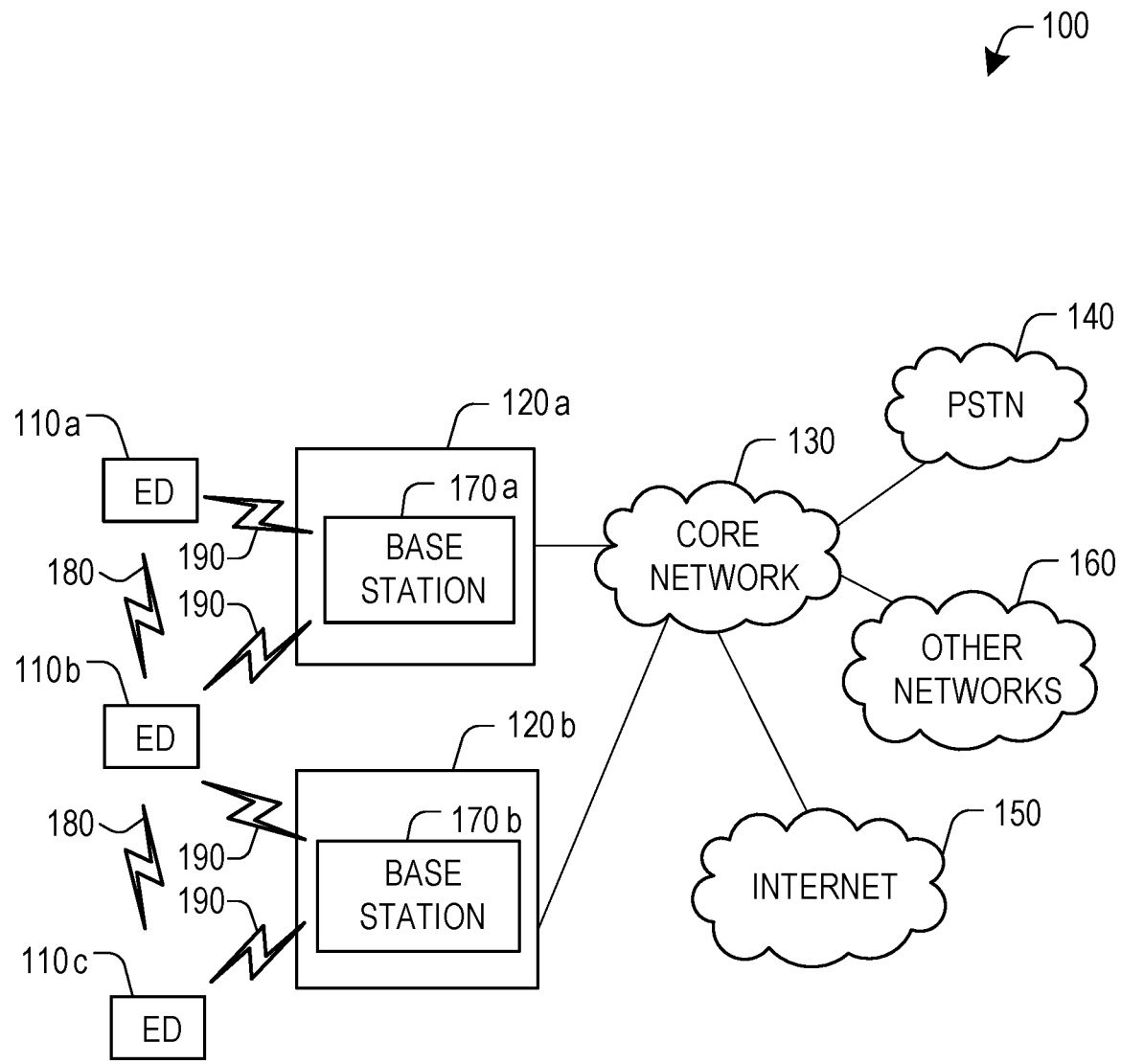
FIG. 2 is a schematic diagram of a communication system in which embodiments of the disclosure may occur.
Figure 3A:
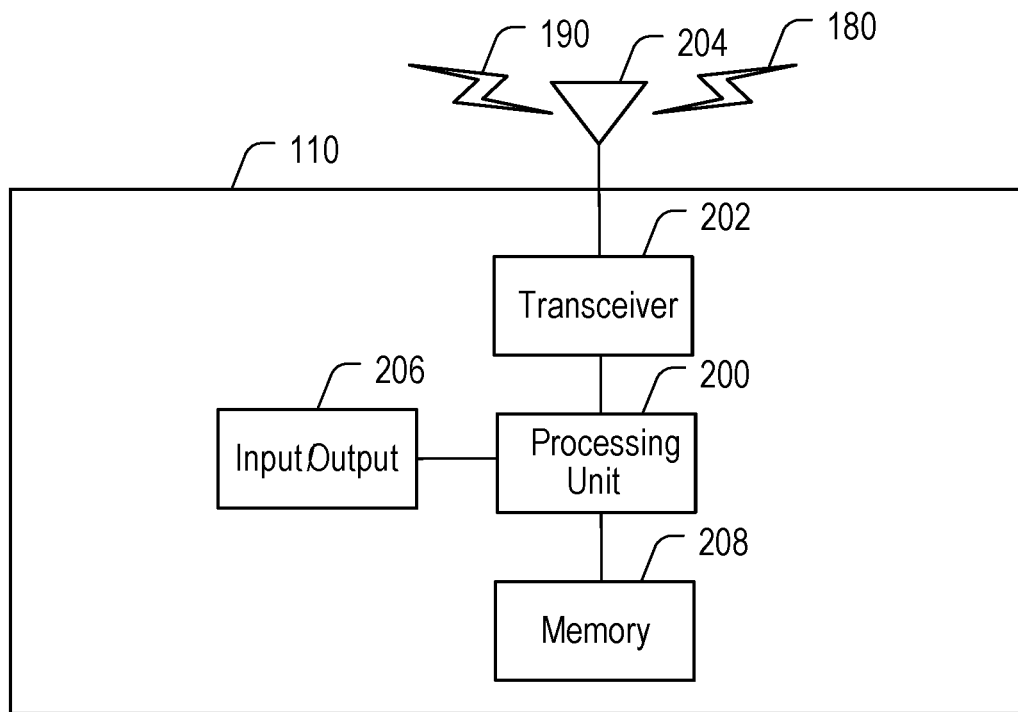
FIGS. 3A and 3B are block diagrams of an example user equipment and base station, respectively, in which embodiments of the disclosure may occur.
Figure 3B:
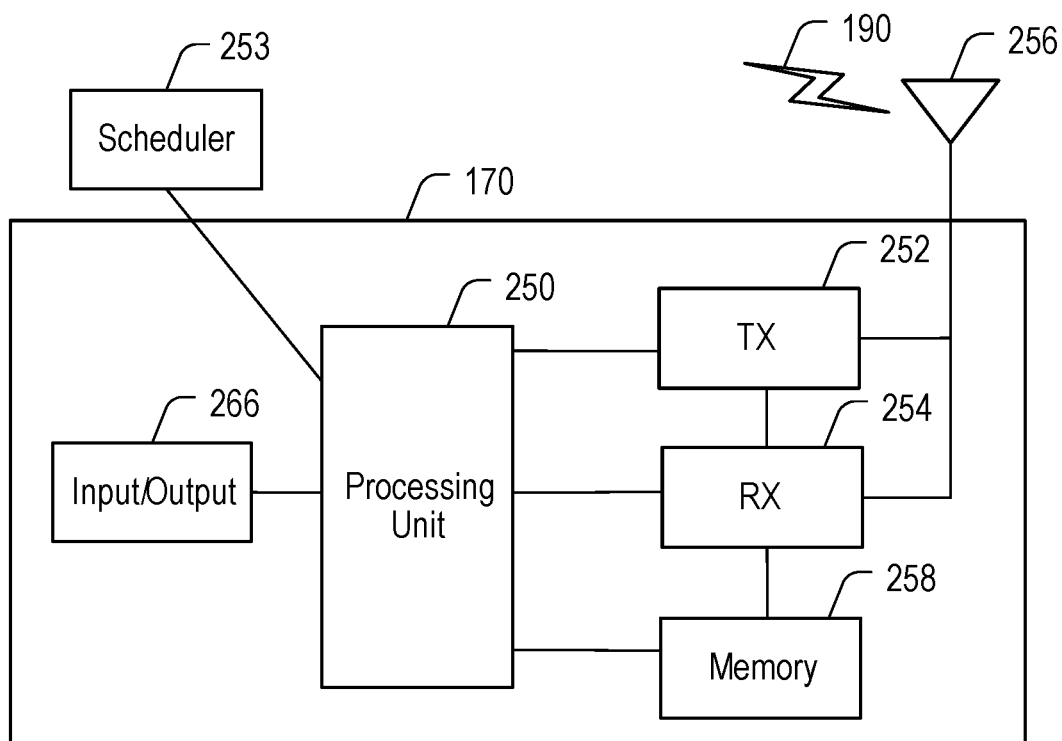

FIGS. 2, 3A, and 3B following below provide context for the network and devices that may be in the network and that may implement aspects of the present disclosure.

FIG. 2 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 2, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 2 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 2, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 2, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 2, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/ or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSPUA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more side link (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

Figure 4:
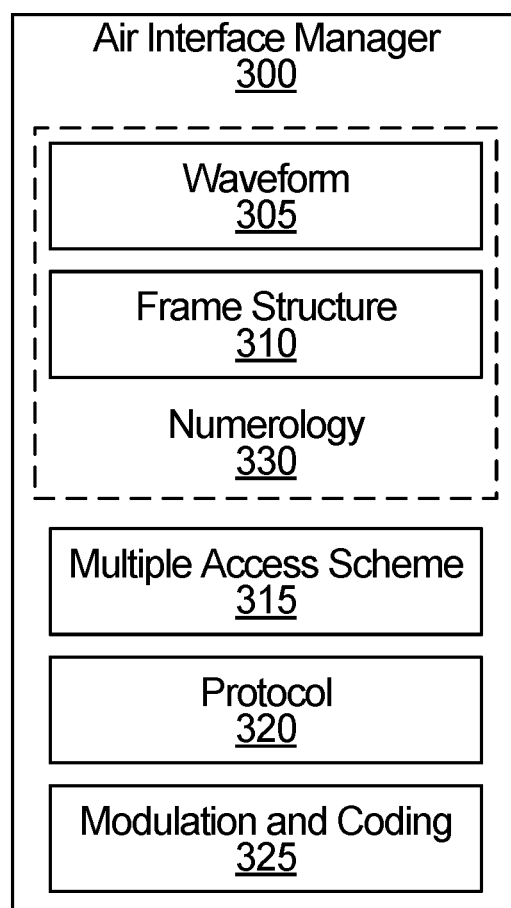
FIG. 4 is a block diagram of an air interface manager for configuring a software-configurable air interface according to an aspect of the present disclosure.

FIG. 4 illustrates a schematic diagram of an air interface manager 300 for configuring a software-configurable air interface 190. The air interface manager 300 may be, for example, a module including a number of components or building blocks that define the parameters of the air interface 190 and collectively specify how a transmission is to be made and/or received by the air interface 190. The air interface manger 300 could also or instead define the parameters of the SL air interface 180 and collectively specify how a transmission is to be made and/or received by the SL air interface 180.

The components of the air interface manger 300 include at least one of a waveform component 305, a frame structure component 310, a multiple access scheme component 315, a protocol component 320, and a modulation and coding component 325.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra-Wideband (UWB), Frequency Modulated Continuous Wave (FMCW), Linear Frequency Modulated (LFM), Orthogonal Frequency Division Multiplexing (OFDM), Single-Carrier Frequency Division Multiple Access (SC-FDMA), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, low Peak to Average Power Ratio Waveform (low PAPR WF), Discrete Fourier Transform-spread-Orthogonal Frequency Domain Modulation (DFT-s-OFDM) and single carrier Offset Quadrature Amplitude Modulation (OQAM). In some embodiments, a combination of waveform options is possible.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval (TTI) or a transmission time unit (TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as sub-carrier spacing width, symbol duration, cyclic prefix (CP) length, channel bandwidth, guard bands/subcarriers, and sampling size and frequency.

Additionally, the frame structure component 310 may further specify whether the frame structure is used in a time-division duplex communication or a frequency-division duplex communication.

Additionally, the frame structure component 310 may further specify the transmission state and/or direction for each symbol in a frame. For example, each symbol may independently be configured as a downlink symbol, an uplink symbol, or a flexible symbol.

Together, the specifications of the waveform component and the frame structure component are sometimes known as the "numerology." Thus, the air interface 190 may include a numerology component 330 defining a number of air interface configuration parameters, such as the sub-carrier spacing, CP length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing may be compatible with LTE. A numerology with 15 kHz subcarrier spacing may serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths. In addition, subcarrier spacing may depend on the operational frequency band. For example, the subcarrier spacing in millimeter wave frequencies may be higher than in lower frequencies.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz, 120 KHz, 240 KHz, or even 480 KHz and 960 KHz subcarrier spacings. Phase noise may occur at frequencies at and above 70 GHz.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range of quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 315 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Space Division Multiple Access (SDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access or configured grant, contention-based shared channel resource, non-contention-based shared channel resource, and cognitive radio-based access.

The protocol component 320 may specify how a transmission and/or a re-transmission are to be made. Non-limiting examples of transmission and/or re-transmission mechanism options include those that specify a scheduled data pipe size and a signaling mechanism for transmission and/or re-transmission.

The modulation and coding component 325 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to Quadrature Amplitude Modulation (QAM) specified by a complex constellation (including, for example, the modulation technique and order, e.g. 16QAM, 64QAM, 256QAM etc.), or more specifically to various types of advanced modulation methods such as hierarchical modulation, multi-dimensional modulation and low Peak-to-Average Power Ratio (PAPR) modulation.

Because an air interface includes a plurality of components or building blocks, and each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform and frame structure components 305, 310, with a single numerology component 330. Conversely, the air interface manager 300 may separate the modulation and coding component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, profiles, and candidate options, the air interface manager 300 can flexibly adapt to better accommodate diverse wireless traffic types and services. Modifying or updating components, profiles, and candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

Some embodiments of the present disclosure provide a method for estimating phase noise by reducing the imaginary interference on certain PT-RS symbols.

Some embodiments of the present disclosure provide a method for using known interference at the receiver to estimate and correct phase noise.

Some embodiments of the present disclosure provide a method for using zero valued auxiliary PT-RS symbols to mitigate interferences.

While the present application describes tracking phase errors due to phase noise, it should be understood that the underlying principles disclosed herein are not limited to phase noise. The proposed approach can be used to track other types of phase errors.

Figure 5A:
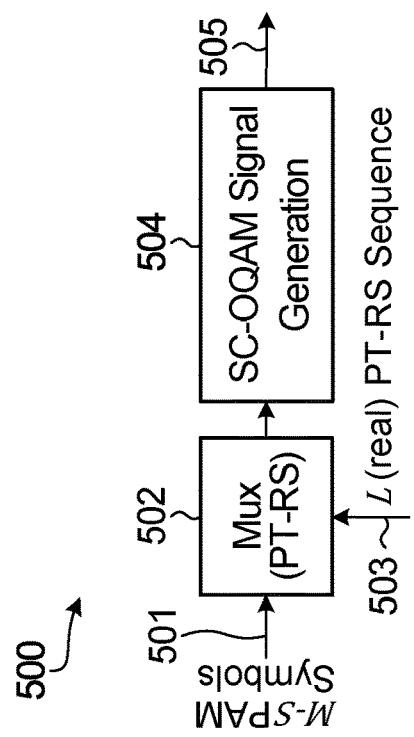
FIG. 5A illustrates a block diagram of a SC-OQAM transmitter that includes a multiplexer for multiplexing a data sequence and a phase tracking reference signal sequence according to an embodiment of the present disclosure.

Referring to FIG. 5A, an example SC-OQAM transmitter 500 will now be described that is configured to implement a PT-RS scheme that can be properly utilized at the receiver.

The focus of FIG. 5A is to illustrate the multiplexing of a sequence of input data symbols 501 and PT-RS symbols 503 at a multiplexer 502 that are then provided to a SC-OQAM signal generation block 504 to generate a signal 505 for transmission that can be used at a receiver to estimate phase error and perform phase error correction based on the PT-RS added at the transmitter 500. A sequence of input symbols 501 is applied to the multiplexer 502 that multiplexes the sequence of input data symbols 501 with the PT-RS sequence of symbols 503. The sequence of input data symbols 501 is an M−S sequence of real-valued symbols where M is an even number and M and S are integer values. This sequence is a sequence of PAM (pulse amplitude modulation) symbols. The multiplexed signal output from the multiplexer 502 is applied to the SC-OQAM signal generation block 504. Further detail about the multiplexing of the sequence of input symbols and PT-RS sequence will be provided in FIG. 5B.

Figure 5B:
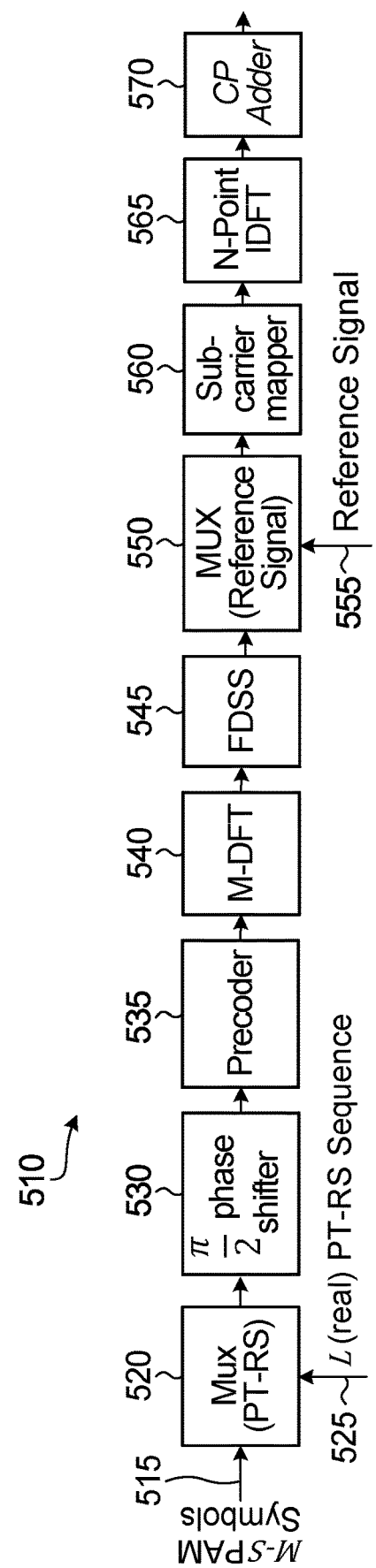
FIG. 5B illustrates a more detailed block diagram of a SC-OQAM transmitter implemented according to an embodiment of the present disclosure.

FIG. 5B is a more detailed example of a SC-OQAM transmitter 510. While FIG. 5B is one example of implementing a SC-OQAM transmitter 510, it should be understood that other arrangements may be used to generate an SC-OQAM signal and such alternative arrangements would not impact the use of a PT-RS scheme as proposed herein.

A sequence of input symbols 515 is applied to a first multiplexer (MUX) 520 that multiplexes the sequence of input symbols 515 with a PT-RS sequence of real-value symbols 525. The multiplexed signal output from the first multiplexer 520 is applied to a $\pi/2$ phase shifter 530. An output of $\pi/2$ phase shifter 530 is applied to a precoder 535. An output of precoder 535 is applied to a M-point discrete Fourier transformer (DFT) 540. An output of DFT 540 is applied to a FDSS 545. An output of FDSS 545 is applied to a second multiplexer (MUX) 550. The second multiplexer 550 multiplexes the output of FDSS 545 with a reference signal 555 that can be used for channel estimation. An output of the second multiplexer 550 is applied to a sub-carrier mapper 560. An output of the sub-carrier mapper 560 is applied to an N-point inverse discrete Fourier transformer (IDFT) 565. An output of the N-point IDFT 565 is applied to a cyclic prefix (CP) adder 570.

In the example of FIG. 5B, the data input 515 is a M−S sequence of real-valued symbols where M is an even number and M and S are integer values. This sequence is a sequence of PAM (pulse amplitude modulation) symbols. The order of the PAM can be of any value, e.g. binary phase shift keying (BPSK), 4-PAM, 8-PAM, etc. The sequence may be generated from (M−S)/2 QAM symbols by separating real and imaginary parts of the QAM symbols and creating the M−S sequence symbols with the real-valued parts. A sequence of such symbols can be denoted as $a_1, a_2, \ldots, a_{M-S}$.

In FIG. 5B, the input PT-RS sequence 525 of L symbols fat, $\{q_1, q_2, \ldots, q_L\}$ is a sequence of real-valued symbols. This sequence can be generated from a similar type of PAM constellation as the data input 515, a BPSK constellation, or any other form of real-valued constellation. In some embodiments, the magnitude of these L symbols can be fixed, and may be equal to the largest element of the corresponding PAM constellation of the data.

While the data input 515 and input PT-RS sequence 525 is described as being real-valued with regard to FIG. 5B, in other embodiments, both the data input and input PT-RS sequence can be imaginary-valued. One way this could be implemented is by multiplying a real-valued sequence by i= $\sqrt{-1}$. Using imaginary-valued sequences as opposed to real-valued sequences has no impact on the transmitter performance. Other embodiments for providing the input and reference signals are possible that enable a result, after a $$\frac{\pi}{2}$$

offset performed by $\pi/2$ phase shifter 530, that the symbols can be alternatively real, imaginary, real or imaginary, real, imaginary. A $\pi/2$ offset shifts every other symbol, so a mix of real and imaginary symbols can be applied and an appropriate $\frac{\pi}{2}$ offset rule applied to provide a result that is alternatively real, imaginary, real or imaginary, real, imaginary.

The first multiplexer 520 multiplexes the M−S PAM symbol input data sequence 515 and the L symbol input PT-RS sequence 525 to create an M symbol output. The first multiplexer 520 adds S−L auxiliary PT-RS symbols as part of the multiplexing process. The value of S, and therefore S−L, depends at least in part on the type of solution being used to perform the phase error estimation. Three different embodiments are described below for multiplexing PT-RS symbols. In some embodiments, the approach is to reduce the self-interference by using auxiliary PT-RS symbols. Other embodiments use knowledge of the pulse shape and input PT-RS to calculate an appropriate PT-RS sequence. In still other embodiments, zero valued auxiliary PT-RS symbols are used to mitigate self-interference.

After multiplexing by the first multiplexer 520, a $\pi/2$ phase offset is performed by the $\pi/2$ phase shifter 530. Let $u_1, u_2, \ldots u_M$ be the output of the first multiplexer 520. The values $u_1, u_2, \ldots, u_M$ are multiplexed data and PT-RS symbols where $u_m \forall m$ are either real-valued or imaginary-valued. The output of the $\pi/2$ phase shifter 530 is denoted by $v_1, v_2, \ldots, v_M$, which is equal to $u_1, iu_2, u_3, iu_4, \ldots, u_{M-1}, iu_M$, or alternatively, the output can be $iu_1, u_2, iu_3, u_4, \ldots, iu_{M-1}, u_M$. Let v be the M×1 column vector where $m^{th}$ element is $v_m$.

The output of the precoder 535 is Ev where E is M×M matrix and v is a M×1 column vector where $m^{th}$ element is $v_m$. In some cases, E is a diagonal matrix. In such a case, the diagonal matrix E can be an identity matrix. Alternatively, the diagonal elements of matrix E can be a fixed constant value ϵ. Alternatively, values of the diagonal elements can be varied. This precoder 535 is optional and may not be present in all SC-OQAM transmitter implementations.

The FDSS 545 performs a pulse shaping operation, also known as spectral shaping. The input to the FDSS 545 is M symbols from the M-point DFT 540. These M symbols are multiplied by FDSS elements of the FDSS 545. These FDSS elements may have J non-zero values. In some embodiments, $$\frac{M}{2} \leq J \leq M, J$$

is an odd integer and the pulse is a conjugate symmetrical square root Nyquist pulse. In some embodiments, $$\frac{M}{2} \leq J \leq M$$

can be either odd or even. In some embodiments, J can be larger than M, however, in such an embodiment the input is cyclically repeated to create a J length input.

The pulse shaping operation performed by the FDSS 545 is usually performed using a square root of a pulse in the frequency domain, in which the coefficients are denoted by $\sqrt{F_1}, \sqrt{F_2}, \ldots, \sqrt{F_J}$. The same square root pulse is used at the receiver as the match filter. The combined use of these two square root pulses at the transmitter and receiver creates a pulse with coefficients denoted by $F_1, F_2, \ldots, F_J$. In the case of a Nyquist pulse, the transmitter uses a square root Nyquist pulse and receiver uses the same square root Nyquist pulse such that the combined affect is a Nyquist pulse.

Pulse shaping in the frequency domain is equivalent to time domain filtering, in which the filter having a length $(T_1+T_2+1)$ that can be odd or even. The time domain pulse coefficients can be represented as $f_{-T_1}, f_{-T_1+1}, \ldots, f_{-1}, f_0, f_1, f_2, \ldots, f_{T_2-1}, f_{T_2}$ where the peak of the filter is $f_0$. Some of the filter coefficients may be zero.

For the case where J≤M, one way to find an equivalent filter is by zero padding the J elements of the combined transmitter and receiver pulse $F_1, F_2, \ldots F_J$ by M−J zero elements and then performing a M-point IDFT. Other methods can be used to implement the FDSS operation, including implementation in the form of a time domain filter.

In the case where the pulse shape is a conjugate symmetrical Nyquist pulse, the filter is conjugate symmetrical (i.e. the length is odd) and $f_t$=0, where all t are even integers, except for t=0. In a particular example, if the pulse is a raised cosine with a roll off factor 1, the corresponding filter is of length 3 and coefficients are given by $f_{-1}$=0.5, $f_0$=1, $f_1$=0.5.

The second multiplexer 550 multiplexes the output of the FDSS 545 with a reference signal 555 that can be used for channel estimation. As there are multiple ways to do this operation, and the operation is not specifically related to this invention, they will not be discussed in further detail.

The sub-carrier mapping performed by the sub-carrier mapper 560 can be localized, distributed or any other type of mapping. After subcarrier mapping, and zero padding or multiplexing for different users, or both, an N-point IDFT is performed by the N-point IDFT 565. A CP can then be added before transmission of the SC-OQAM signal.

In some embodiments, self-interference caused by the input data on the PT-RS symbols is mitigated by the use of auxiliary PT-RS symbols. Therefore, at a receiver there is little to no self-interference observed from the input data on the PT-RS symbols.

For the sake of explanation, four types of PT-RS symbols will now be defined that are used in the following description. A first type is the L length input PT-RS sequence of symbols, which is denoted by $\{q_1, q_2, \ldots, q_L\}$, which correspond to the PT-RS input 525 in FIG. 5B. A second type is the S−L length auxiliary PT-RS sequence of symbols generated at the multiplexer that multiplexes the input data and PT-RS sequence, for example the first multiplexer 520 in FIG. 5B. The first and second types of PT-RS symbols are combined at the first multiplexer 520 to create a third type, which is an S length PT-RS sequence of symbols called the resultant PT-RS sequence. The resultant PT-RS sequence is multiplexed with the M−S PAM symbol sequence data input to create an output of the M symbols. The fourth type is identified as usable PT-RS symbols, which are used at the receiver to estimate phase errors. The transmitter and receiver agree on which PT-RS symbols are used for estimating phase error. These symbols are the usable PT-RS symbols. Once it is agreed, the transmitter multiplexes the data input symbols, the input PT-RS symbols and the auxiliary PT-RS symbols in such a way that it guarantees that interference is mitigated on these symbols at the receiver.

The third type of PT-RS, the resultant PT-RS symbols, are multiplexed as X chunks of PT-RS symbols with Y portions of the input data sequence. Each chunk has a chunk size of K symbols, where K≥1. Each PT-RS chunk includes V blocks of PT-RS symbols, where V≥1, arranged in a particular pattern, which may or may not include input data symbols. This means that there may be data symbols between the PT-RS symbols, or no data symbols between the PT-RS symbols. Each of the V blocks of PT-RS symbols includes W adjacent PT-RS symbols. The size W of each block is a number of consecutive PT-RS symbols.

When there are multiple chunks, the chunks can have a similar, or different, pattern that repeats over the span of data symbols. Usually a large number of data symbols separate the PT-RS chunks. Within a chunk, there may be input PT-RS symbols, auxiliary PT-RS symbols, usable PT-RS symbols (defined above as the PT-RS symbols that are used at the receiver) and data symbols. A chunk of PT-RS symbols starts with a PT-RS symbol, which can be auxiliary or usable, and ends with a PT-RS symbol, which can be auxiliary or usable. As an example, a sequence of data symbols may include 1200 symbols, which may include only 1, 2, 4 or 8 PT-RS chunks spread out within the 1200 data symbols.

Figure 6:
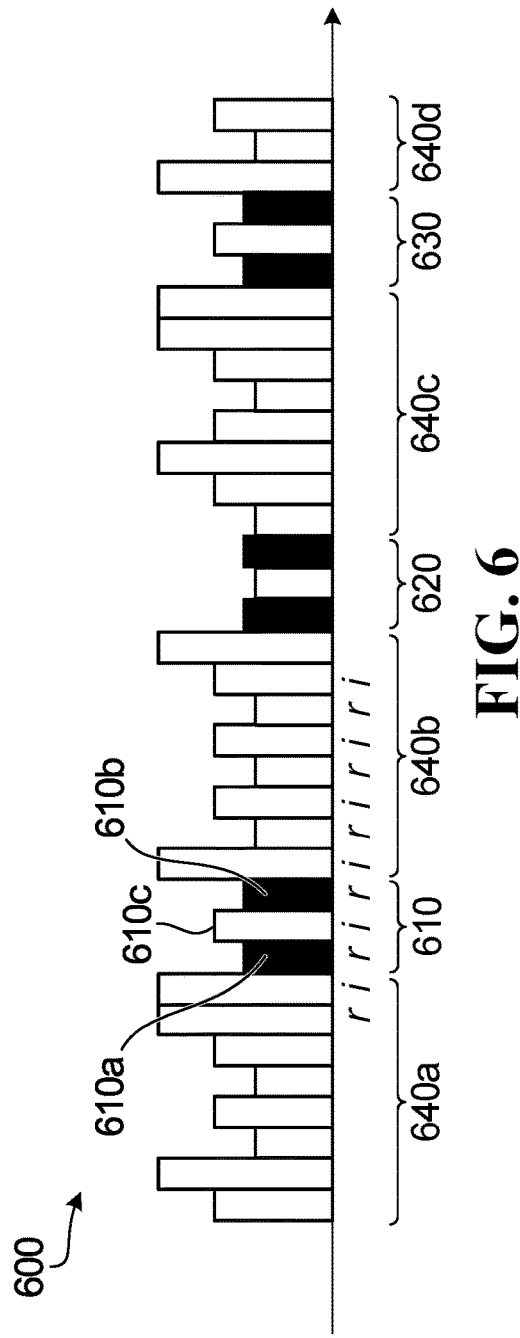
FIG. 6 illustrates a graphical plot of a multiplexed version of data and phase tracking reference of a SC-OQAM transmitter according to an embodiment of the present disclosure.

FIG. 6 shows an example of a multiplexed sequence 600 of input symbols and PT-RS symbols. This multiplexed sequence is an output of $$\frac{\pi}{2}$$

phase shifter 530. FIG. 6 is a time domain representation of data and PT-RS symbols. The "r" and "i" below the individual symbols are to indicate real and imaginary symbols as the $$\frac{\pi}{2}$$

phase shifter 530 shifts every other symbol by $$\frac{\pi}{2}$$

resulting in a sequence of alternating real and imaginary valued symbols.

In FIG. 6, there are X=3 chunks, the chunk size K is equal to 3, there are includes V=2 blocks and the block size W is 1. In FIG. 6, the three chunks are first chunk 610, second chunk 620, and third chunk 630. The first chunk 610 includes two blocks, first block 610a and second block 610b, that are each comprised of a single (i.e. W=1) PT-RS symbol. More generally, it is to be understood that a block is W consecutive PT-RS symbols. In the example of FIG. 6, there is a single input data symbol 610c between the two blocks 610a and 610b. There are Y=4 portions 640a, 640b, 640c and 640d of the input data sequence.

The PT-RS symbols are shown in black and the input data symbols are shown in white.

When performing the multiplexing of the PT-RS with the input data, the PT-RS symbols in the multiplexed stream can be denoted as $p_{mn}$ in which m is the resultant PT-RS symbol of the $n^{th}$ PT-RS chunk, where $m \in \mathcal{G}_n$, $\mathcal{G}_n \subset \{1, 2, \ldots, K\}$, $|\mathcal{G}_n|=S_n$, $n \in \{1, 2, \ldots, X\}$, and $\Sigma_{n=1}^{X} S_n = S$. That means the resultant PT-RS symbols, defined above as the combination of input PT-RS symbols and auxiliary PT-RS symbols, are multiplexed with the data input sequence inside the $n^{th}$ PT-RS chunk. The input PT-RS symbols are located at $m \in \mathcal{H}_n$, $\mathcal{H}_n \subset \mathcal{G}_n$, $|\mathcal{H}_n|=L_n$, $\Sigma_{n=1}^{X} L_n = L$ and the auxiliary PT-RS symbols are located at $m \in \mathcal{Q}_n, \mathcal{Q}_n \subset \mathcal{G}_n$, $|\mathcal{Q}|=S_n - L_n$.

It can be shown that $\mathcal{H}_n \cap \mathcal{Q}_n = \phi$ (null set) and $\mathcal{G}_n = \mathcal{H}_n \cup \mathcal{Q}_n$. Furthermore, for each $h \in \mathcal{H}_n$, there should be at least one auxiliary PT-RS symbol within $\{h-T_1, h-T_1+1, \ldots h+T_2\}$ locations. That is $\{h-T_1, h-T_1+1, \ldots, h-1, h, h+1, \ldots, h+T_2\} \cap \mathcal{Q}_n \neq \phi$ (null set) for each $h \in \mathcal{H}_n$. $T_1$ and $T_2$ are related to the pulse shaping filter defined above.

If $\{q_{1n}, q_{2n}, \ldots, q_{L_n n}\} \subset \{q_1, q_2, \ldots, q_L\}$ is an input PT-RS sequence of length $L_n$ for the $n^{th}$ PT-RS chunk, then, the resultant PT-RS symbols are:

$$p_{mn} = \begin{cases} q_{mn}, & m \in \mathcal{H}_n \\ \tilde{p}_{mn}, & m \in \mathcal{Q}_n \end{cases}$$

where $q_{nm}$ denotes the input PT-RS symbol and $\tilde{p}_{mn}$ denotes the auxiliary PT-RS symbols. Within the $n^{th}$ PT-RS chunk, the data is located at $\bar{\mathcal{G}}_n$ where $\bar{\mathcal{G}}_n$ is the complement of $\mathcal{G}_n$ such that $\mathcal{G}_n \cup \bar{\mathcal{G}}_n = \{1, 2, \ldots, K\}$ and $\mathcal{G}_n \cap \bar{\mathcal{G}}_n = \phi$ (null set). $a_{mn} \forall m \in \bar{\mathcal{G}}$ is a subset of the input data. If $u_{mn}$ is the $m^{th}$ symbol, which may represent the PT-RS and the input data depending on location m, on the $n^{th}$ PT-RS chunk, then $u_{mn}$ is given by $$u_{mn} = \begin{cases} p_{mn}, & m \in \mathcal{G} \\ a_{mn}, & m \in \bar{\mathcal{G}} \end{cases}$$

Let $u_{mn}$ for $m \in \{-T_2+1, -T_2+2, \ldots, 0, K+1, K+2, \ldots, K+T_1\}$ represent the symbols outside of the $n^{th}$ PT-RS chunk, i.e. before or after the $n^{th}$ PT-RS chunk. These symbols can be data. Let $v_{mn}$ be the output of the $\pi/2$ phase shifter of the transmitter, which corresponds to $u_{mn}$, i.e, $v_{mn}=u_{mn}$ or $v_{mn}=iu_{mn}$ depending on the location. Then, the auxiliary PT-RS symbols can be determined such that the following is satisfied $\forall h \in \mathcal{H}_n$ that fall into real component index after $\pi/2$ phase shifter 530

$$\sum_{m=h-T_1}^{h+T_2} f_{m-h} v_{mn} = f_0(q_{hm} \pm ic_{hm}), \forall h \in \mathcal{H}_n$$

Alternatively, $\forall h \in \mathcal{H}_n$ that fall into imaginary component index after $\pi/2$ phase shifter 530, the auxiliary PT-RS symbols can be determined such that the following is satisfied $$\sum_{m=h-T_1}^{h+T_2} f_{m-h} v_{mn} = f_0(iq_{hm} \pm c_{hm}), \forall h \in \mathcal{H}_n$$

In this equation $c_{hm}$ is zero if exact interference cancelation occurs, or $c_{hm}$ is a small value if exact interference cancellation does not occur, but this can be ignored if small.

The condition $\{h-T_1, h-T_1+1, \ldots, h-1, h, h+1, \ldots, h+T_2\} \cap \mathcal{Q}_n \neq \phi$ (null set) for each $h \in \mathcal{H}_n$, which is specified above, guarantees there is at least one auxiliary PT-RS symbol in the above equation for each $h \in \mathcal{H}_n$. These $|\mathcal{H}_n|=L_n$ equations can be solved with a desired power constraint on auxiliary PT-RS symbols.

A result of the manner in which auxiliary PT-RS symbols are used in the embodiments described above is that there is no interference, or only a small amount of interference, on the input PT-RS symbols. Therefore, the usable PT-RS symbols at the receiver are the same as the input PT-RS symbols applied to the first multiplexer. In the case where $c_{hm}$ is a fixed constant that is known to both the transmitter and receiver, the usable PT-RS symbols are $q_{hm} \pm ic_{hm}$.

Figure 7:
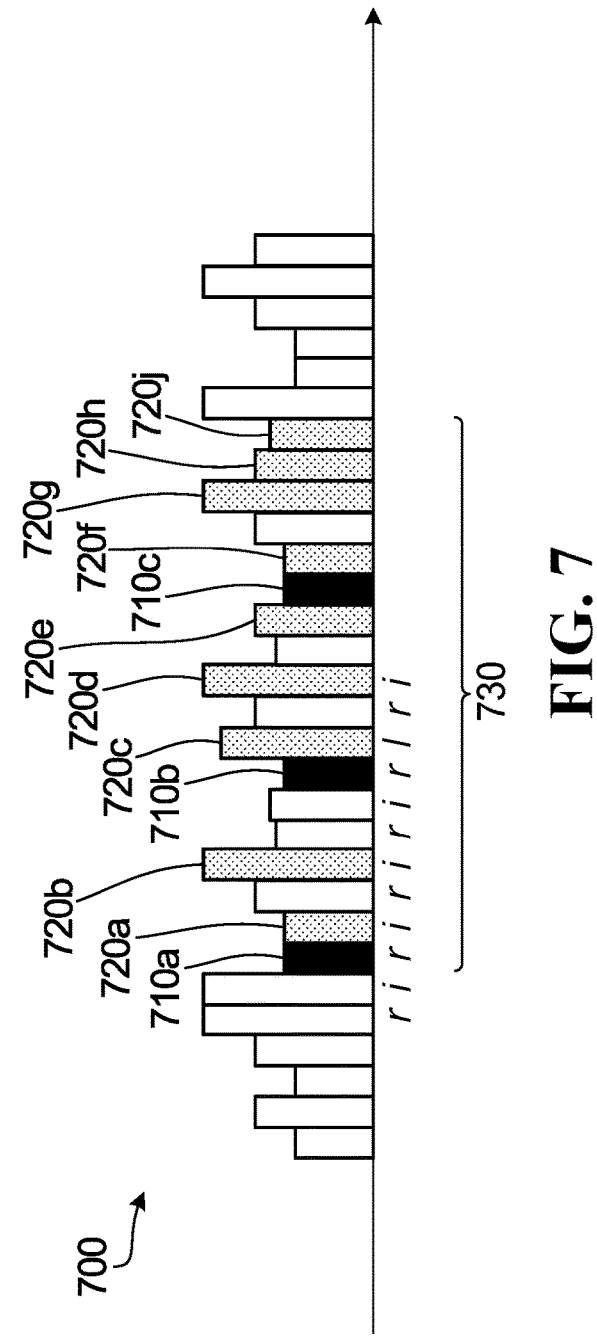
FIG. 7 illustrates a graphical plot of a multiplexed version of data and phase tracking reference signal of a SC-OQAM transmitter according to an embodiment of the present disclosure.

Referring now to FIG. 7, an example is shown in which the auxiliary PT-RS symbols and the input PT-RS symbols are multiplexed with the input data symbols. This multiplexed sequence is an output of $$\frac{\pi}{2}$$

phase shifter 530. FIG. 7 is a time domain representation of data and PT-RS symbols. The "r" and "i" below the individual symbols are to indicate real and imaginary symbols as the $$\frac{\pi}{2}$$

phase shifter 530 shifts every other symbol by $$\frac{\pi}{2}$$

resulting in a sequence of alternating real and imaginary valued symbols.

In the example of FIG. 7, the purpose of auxiliary PT-RS symbols is to reduce interference on the input PT-RS symbols. There are 3 input PT-RS symbols 710a, 710b and 710c and 9 auxiliary PT-RS symbols 720a, 720b, 720c, 720d, 720e, 720f, 720g, 720h, and 720i. In FIG. 7, there is X=1 chunk, having a chunk size K that is equal to 18. In FIG. 7, the single chunk is chunk 730. The chunk 730 includes V=3 blocks, where the block size W is equal to 1. The three blocks are first block 710a, second block 710b and third block 710c, which are each comprised of a single (i.e. W=1) input PT-RS symbol. In the example of FIG. 7, there are several input data symbols in the chunk 730. The input PT-RS symbols are shown as black columns, the auxiliary PT-RS symbols are shown as light grey columns and the input data symbols are shown as white columns.

Several special case embodiments will now be described in detail.

In one special case embodiment, a number of auxiliary PT-RS symbols is equal to a number of input PT-RS symbols. In this case $S_n=2L_n$ which are $L_n$ input PT-RS symbols and $L_n$ auxiliary PT-RS symbols. In general, for each input PT-RS symbol $h \in \mathcal{H}_n$, at least one auxiliary PT-RS symbol is located within $\{h-T_1, h-T_1+1, \ldots h+T_2\}$ indexes to cancel the interference on input PT-RS symbols. In some embodiments, each auxiliary PT-RS symbol is located either at $h-1$ or $h+1$ for each $h \in \mathcal{H}_n$. As such, an auxiliary PT-RS symbol is placed next to an input PT-RS symbol. The reason behind this approach is that the pulse coefficients $f_{-1}$ and $f_1$ have larger magnitude than $f_t, |t|>1$, and therefore, these particular pulse coefficients have an advantage over the power constraint of the auxiliary PT-RS symbols. In other words, as $f_1$ and $f_{-1}$ are larger than $f_t, |t|>1$, less power can be used on auxiliary PT-RS to get the same affect. As the interference is $f_t \tilde{p}_{mn}$, when $f_t$ is large then $\tilde{p}_{mn}$ can be small as opposed to when $f_t$ is small and $\tilde{p}_{mn}$ is larger.

Figure 8:
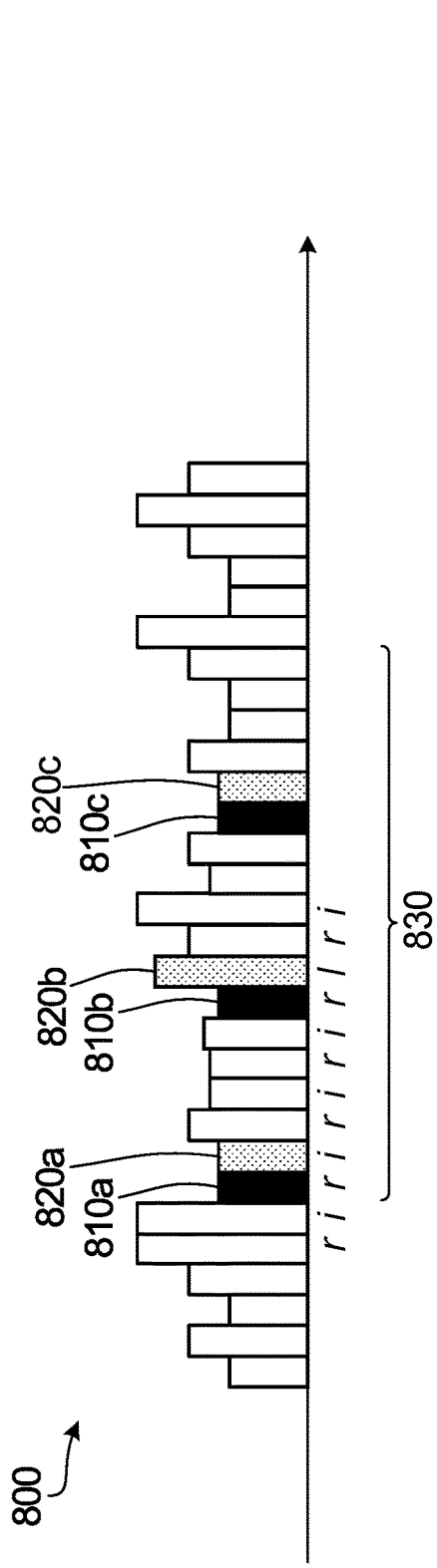
FIG. 8 illustrates a graphical plot of a multiplexed version of data and phase tracking reference signal of a SC-OQAM transmitter according to an embodiment of the present disclosure.

In another particular embodiment, input PT-RS symbols are allocated such that the distance between two consecutive input PT-RS symbols is fixed and each auxiliary PT-RS symbol is placed next to an input PT-RS symbol. In this approach the number of input PT-RS symbols is equal to the number of auxiliary PT-RS symbols. As a result, the auxiliary PT-RS symbol calculation is uniform and simple. The distance between two consecutive input PT-RS symbols may be fixed to a number that is larger than half the pulse filter length so that there is no interference from other PT-RS symbols. This way, the calculation of auxiliary PT-RS symbols is easy. FIG. 8 provides an illustration of a multiplexed stream generated in this manner. In the example, the light grey columns show the input data symbols, the dark grey columns represent the input PT-RS symbols, and the medium grey columns represent the auxiliary PT-RS symbols.

FIG. 8 is a time domain representation of data and PT-RS symbols. This multiplexed sequence is an output of $$\frac{\pi}{2}$$

phase shifter 530. The "r" and "i" below the individual symbols are to indicate real and imaginary symbols as the $$\frac{\pi}{2}$$

phase shifter 530 shifts every other symbol by $$\frac{\pi}{2}$$

resulting in a sequence of alternating real and imaginary valued symbols. There are 3 input PT-RS symbols 810a, 810b and 810c and 3 auxiliary PT-RS symbols 820a, 820b, and 820c. In FIG. 8, there is X=1 chunk, having a chunk size K that is equal to 14. In FIG. 8, the single chunk is chunk 830. The chunk 830 includes V=3 blocks, where the block size W is equal to 1. The three blocks are first block 810a, second block 810b and third block 810c, which are each comprised of a single (i.e. W=1) input PT-RS symbol. In the example of FIG. 8, there are several input data symbols in the chunk 830. The input PT-RS symbols are shown as black columns, the auxiliary PT-RS symbols are shown as light grey columns and the input data symbols are shown as white columns.

In another particular embodiment, the spacing between two consecutive input PT-RS symbols is fixed at 2 symbols and an auxiliary PT-RS symbol is placed in between. In this approach the number of input PT-RS symbols is equal to the number of auxiliary PT-RS symbols. In this approach, the input PT-RS symbols are closely packed, which can help to increase the accuracy of phase noise estimation.

Figure 9:
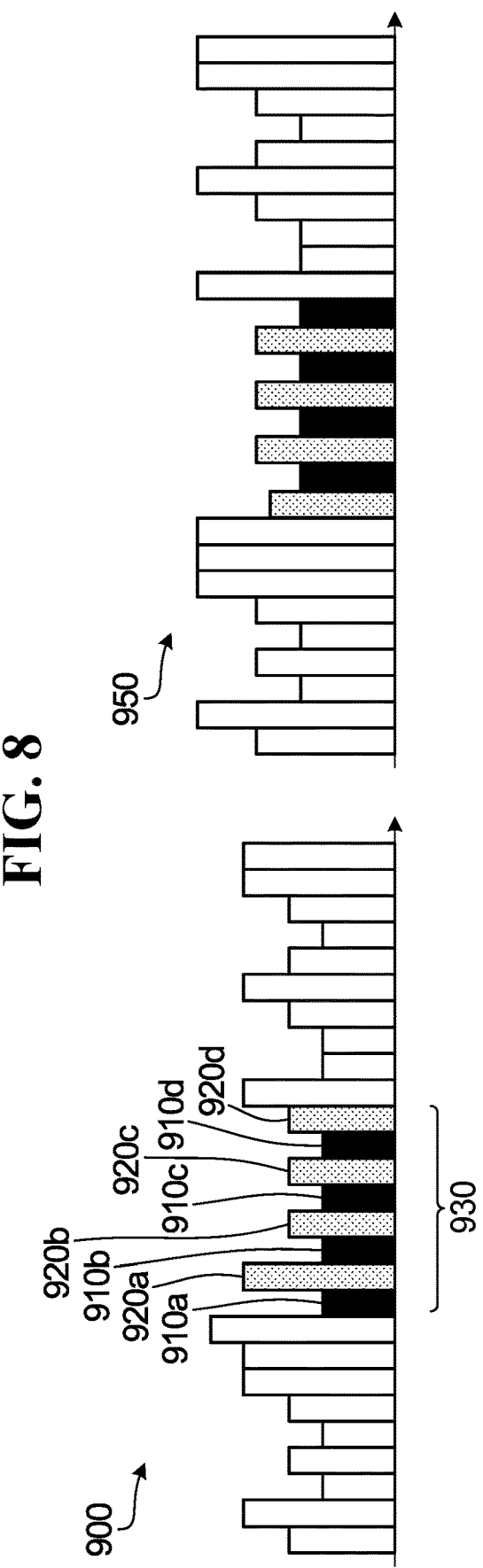
FIG. 9 illustrates two graphical plots of multiplexed versions of data and phase tracking reference signal of a SC-OQAM transmitter according to embodiments of the present disclosure.

FIG. 9 provides two illustrations of a multiplexed stream generated in this manner. The two multiplexed streams in FIG. 9 are time domain representations of data and PT-RS symbols. These multiplexed sequences are two different outputs of phase shifter 530. While not indicated in the multiplexed streams, the individual symbols are alternating real and imaginary symbols as the $$\frac{\pi}{2}$$

phase shifter 530 shifts every other symbol by $$\frac{\pi}{2}$$

resulting in a sequence of alternating real and imaginary valued symbols.

In the multiplexed stream 900 on the left-hand side of FIG. 9, the auxiliary PT-RS symbols are placed on the right side of the input PT-RS symbols. In the multiplexed stream 950 right-hand side figure, the auxiliary PT-RS symbols are placed on the left side of input PT-RS symbols. In the example, the white columns show the input data symbols, the black columns represent the input PT-RS symbols, and the light grey columns represent the auxiliary PT-RS symbols. There are 4 input PT-RS symbols 910*a*, 910*b*, 910*c* and 910*d* and 4 auxiliary PT-RS symbols 920*a*, 920*b*, 920*c* and 920*d*. In FIG. 9, there is X=1 chunk having a chunk size K that is equal to 8. In FIG. 9, the single chunk is chunk 930. The chunk 930 includes V=4 blocks, where the block size W is 1. The four blocks are first block 910*a*, second block 910*b*, third block 910*c*, and fourth block 910*d*, which are each comprised of a single (i.e. W=1) input PT-RS symbol. In the example of FIG. 9, there are no input data symbols between in chunk 930.

In some embodiments, some of the elements of the pulse shape filter are equal to zero. In such embodiments, there is no advantage to allocate PT-RS symbols on these locations relative to the input PT-RS symbol locations. If $f_T = 0$ for $\mathcal{T} \subset \{-T_1, -T_1+1, \ldots, -1, 0, 1, \ldots, T_2\}$, then for each h∈ $\mathcal{H}_n$ there is no advantage to allocate auxiliary PT-RS symbols at h−$\mathcal{T}$ locations as the symbols at these locations do not contribute to mitigating the interference.

A special case of a pulse shaping filter is a conjugate symmetrical Nyquist pulse where $T_1=T_2$ and $f_t=0$, where all t are even integers, except for t=0. This may be a highly likely situation in SC-OQAM. In such a case, auxiliary PT-RS symbols are placed at symbol locations that are an odd number of symbol locations from the input PT-RS symbols, or in other terms, the auxiliary PT-RS symbols are placed only in h±t locations where t is odd. This can be seen in either of the multiplexed sequences 900 or 950 in FIG. 9.

Another special case embodiment is when the pulse filter length is equal to 3. A particular example of this is a raised Cosine pulse with roll-off factor 1. In such a case, there is only one auxiliary PT-RS symbol used per input PT-RS symbol, which can be placed on either the left side or the right side of the input PT-RS symbol. Two different examples of this are shown in FIG. 10.

The two multiplexed streams in FIG. 10 are time domain representations of data and PT-RS symbols. These multiplexed sequences are two different outputs of phase shifter 530. While not indicated in the multiplexed streams, the individual symbols are alternating real and imaginary symbols as the $$\frac{\pi}{2}$$

phase shifter 530 shifts every other symbol by $$\frac{\pi}{2}$$

resulting in a sequence of alternating real and imaginary valued symbols. Also shown in FIG. 10 is a representation of how interference may occur in the multiplexed sequences, as a result of the FDSS.

In a first multiplexed sequence 1000, column 1010*a* is an input data symbol that causes the interference to a first input PT-RS symbol 1010*b* shown as a black column. The light grey auxiliary PT-RS symbol 1010*c* acts to cancel the interference from the first input symbol 1010*a*. However, auxiliary PT-RS symbol 1010*c* causes interference to a second input PT-RS symbol 1010*d*. Auxiliary PT-RS symbol 1010*e* acts to cancel the interference from auxiliary PT-RS symbol 1010*c* on the second input PT-RS symbol 1010*d*. This continues until the final auxiliary PT-RS symbol 1010*h* acts to cancel the interference from auxiliary PT-RS symbol 1010*f* on input PT-RS symbol 1010*g*. For a second multiplexed sequence 1050, a similar approach is used, except that a symbol before the first input PT-RS symbol is a auxiliary PT-RS symbol that can cause interference with the first input PT-RS and an input PT-RS symbol may cause interference with the last input PT-RS symbol.

Figure 11:
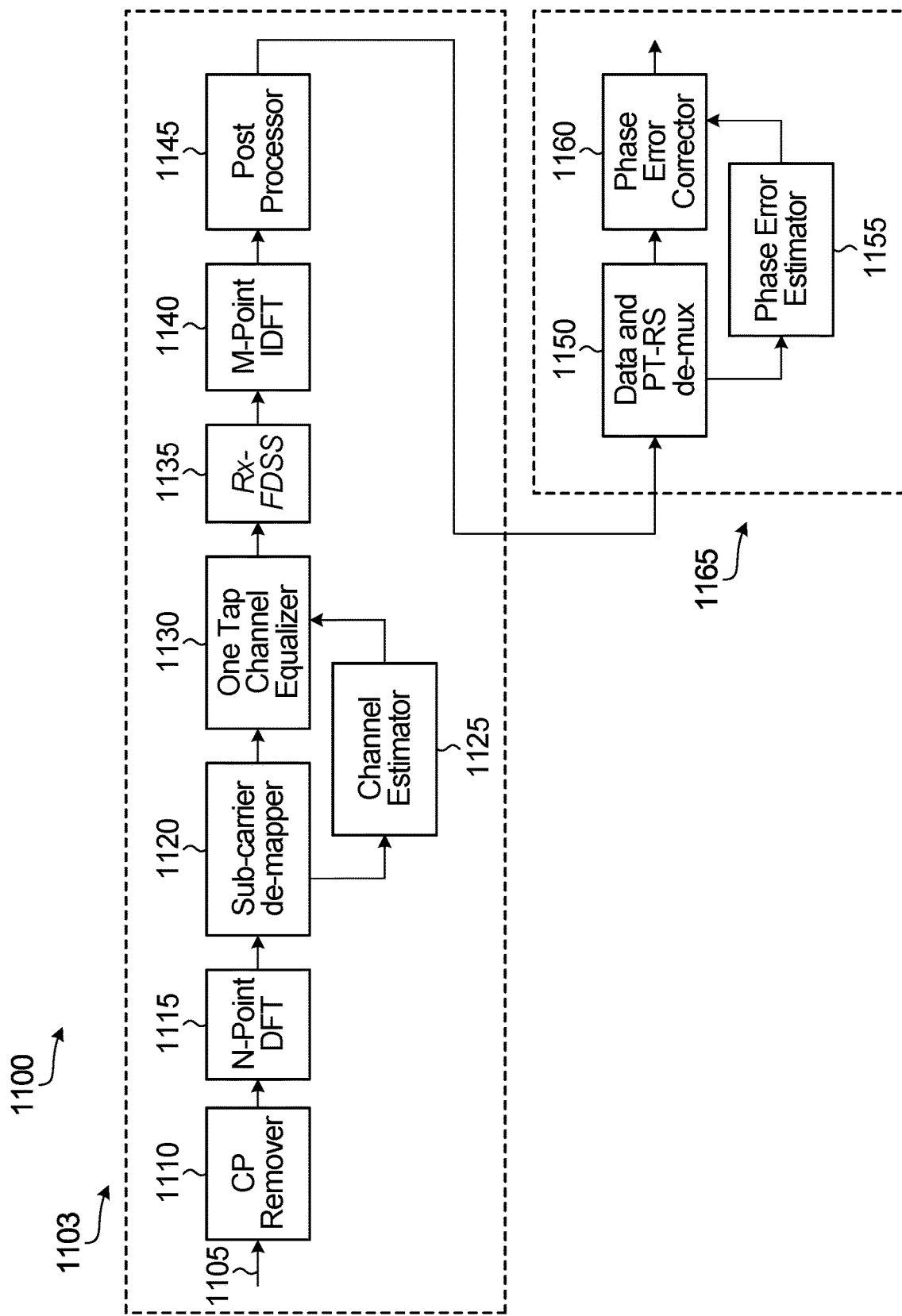
FIG. 11 illustrates a block diagram of a SC-OQAM receiver that includes a phase error estimator and phase error corrector phase tracking that uses a phase tracking reference signal sequence according to an embodiment of the present disclosure.

Referring to FIG. 11, an example SC-OQAM receiver 1100 will now be described that is configured to implement a PT-RS scheme for detecting and correcting a phase error. A sequence of input symbols 1105 is received at the receiver 1100 and applied to a cyclic prefix (CP) remover 1110. An output of the CP remover 1110 is applied to a N-point DFT 1115. An output of the N-point DFT 1115 is applied to a sub-carrier demapper 1120. An output of the sub-carrier mapper 1120 is applied to a channel estimator 1125 and a one tap channel equalizer 1130. An output of the channel equalizer 1125 is also applied to the one tap channel equalizer 1130. An output of the one tap channel equalizer 1130 is applied to a receiver frequency domain spectral shaper (Rx FDSS) 1135. An output of the Rx FDSS 1135 is applied to an M-point IDFT 1140. An output of the M-point IDFT 1140 is applied to post processor 1145. The first dashed area 1103 that includes the elements from the CP remover 1110 to the post processor 1145 is one approach for waveform demodulation in the receiver 1100. It should be understood that other arrangements may be used to receive and demodulate an SC-OQAM signal and such alternative arrangements would not impact the use of a PT-RS scheme as proposed herein.

An output of the dashed area 1103 is a sequence of received symbols that include data and PT-RS symbols. Another dashed area 1165 includes a demultiplexer (demux) 1150, a phase error estimator 1155 and a phase error corrector 1160. An output of the post processor 1145 is applied to the demultiplexer 1150 that demultiplexes the data and PT-RS symbols. A first output of the demultiplexer 1150, which is the PT-RS symbols, is applied to the phase error estimator 1155 and a second output of the of the demultiplexer 1150, which is the data, is applied to the phase error corrector 1160. An output of the phase error estimator 1155 is also applied to the phase error corrector 1160. An output of the phase error estimator corrector 1160 is the data symbols that have been corrected for phase noise error that may have occurred during transmission.

In the demutiplexer 1150, the data and PT-RS are de-multiplexed according to a same arrangement as at the transmitter multiplexing operation. The output consists of a sequence of data symbols and a sequence of PT-RS symbols.

At the phase error estimator 1155, the PT-RS symbols output from the demutiplexer 1150 are received. The usable PT-RS symbols are the same as the input PT-RS symbols at the transmitter as interference on the input PT-RS symbols is effectively cancelled or reduced by the auxiliary PT-RS symbols. The receiver 1100 discards the auxiliary PT-RS symbols. The receiver 1100 can then estimate the phase error using the received usable PT-RS symbols.

When performing the phase error estimation, the received usable PT-RS symbols can be considered $\hat{p}_{mn}$ and the usable PT-RS symbol can be considered $p_{mn}$. The phase error is estimated at this particular symbol location to be $$PE_{mn} = \arg\left(\frac{\hat{p}_{mn}}{p_{mn}}\right).$$

It should be understood that methods other than the above mentioned approach using $p_{mn}$ and $\hat{p}_{mn}$ can be used to estimate the phase error. Once the phase error estimator 1155 estimates the phase error at all the usable PT-RS locations, the phase error estimator 1155 uses an interpolation method to estimate phase error at data locations. This interpolation can be a simple average, linear interpolation, same value as the closest phase error estimation, or any other method.

When performing the phase error correction, the phase error corrector 1160 is used to correct the phase error of the data points. In some embodiments, a simple approach is to divide the received data symbol by the estimated phase error to remove the phase error in the received signal. In other embodiments, other methods can be used to correct phase errors using the estimated phase errors.

For embodiments where interference on the input PT-RS is effectively canceled by the auxiliary PT-RS symbols, phase noise can be estimated on an SC-OQAM waveform. This can result in a significant BLER performance gain through the correction of phase noise. The proposed approach does not increase the PAPR, which makes it particularly suitable for SC-OQAM.

A particular benefit for such embodiments is that the receiver does not need to know pulse shape detail to estimate phase errors.

In some embodiments, an alternative PT-RS method uses the known interference at the receiver to estimate phase errors.

When performing the multiplexing of the PT-RS, $p_{mn}$ can be the $m^{th}$ resultant PT-RS symbol of the $n^{th}$ PT-RS chunk where $m \in \{1, 2, \ldots, K\}$ and $n \in \{1, 2, \ldots, X\}$. That means resultant PT-RS symbols consist of only input PT-RS symbols and auxiliary PT-RS symbols inside the $n^{th}$ PT-RS chunk. The number of resultant PT-RS symbols in the $n^{th}$ PT-RS chunk are $S_n = K$. This is somewhat different from the embodiments described above where data can also be multiplexed within the $n^{th}$ PT-RS chunk.

The input PT-RS symbols are located at the center of a chunk and surrounded on either side by auxiliary PT-RS symbols and this can be located at $\{\overline{T}_1+1, \overline{T}_1+2, \ldots, K-\overline{T}_2-1, K-\overline{T}_2\}$ where $\overline{T}_1 = T_1 - R_1$ and $\overline{T}_2 = T_2 - R_2$. The values of $R_1$ and $R_2$ are constants that can have values in the respective ranges of $0 \leq R_1 \leq T_1$ and $0 \leq R_2 \leq T_2$. The number of input PT-RS symbols in the $n^{th}$ PT-RS chunk is $L_n = K - \overline{T}_1 - \overline{T}_2$. The auxiliary PT-RS symbols are located at each end of the chunk of input PT-RS symbols and can be located at $m \in \{1, 2, \ldots, \overline{T}_1\}$ and $m \in \{K-\overline{T}_2+1, K-\overline{T}_2+2, \ldots, K\}$. The number of auxiliary PT-RS symbols in the $n^{th}$ PT-RS chunk is $\overline{T}_1 + \overline{T}_2$. Let $\{q_{1N}, q_{2n}, \ldots, q_{L_n n}\} \subseteq \{q_1, q_2, \ldots, q_L\}$ be the $L_n$ length input sequence for the $n^{th}$ PT-RS chunk. Based on such an allocation, the resultant PT-RS symbols are given by $$u_{mn} = \begin{cases} q_{mn}, & m \in \{\overline{T}_1+1, \overline{T}_1+2, \ldots, K-\overline{T}_2-1, K-\overline{T}_2\} \\ \hat{p}_{mn}, & m \in \{1, 2, \ldots, \overline{T}_1\} \text{ and } m \in \{K-\overline{T}_2+1, K-\overline{T}_2+2, \ldots, K\} \end{cases}$$

The auxiliary PT-RS symbols can take any real value including zero for cases where the data symbols and input PT-RS symbols are real-valued. Likewise, the auxiliary PT-RS symbols can take any imaginary value including zero for cases where the data symbols and input PT-RS symbols are imaginary-valued. Let $v_{mn}$ be the output of the $\pi/2$ phase shifter of the transmitter, which corresponds to $u_{mn}$, i.e, $v_{mn} = u_{mn}$ or $v_{mn} = iu_{mn}$ depending on the location.

In some embodiments, the values of the auxiliary PT-RS are fixed and do not depend on the data. The values of the auxiliary PT-RS may be known to both transmitter and the receiver.

Further, in some embodiments, the auxiliary PT-RS may be set to values such that the interference on the input PT-RS is fixed to a constant value. That is, for input PT-RS $p_{mn} \forall m, n$, the imaginary interference is fixed to a value $id_{mn}$ if the index of the input PT-RS occurs on a real index after the $$\frac{\pi}{2}$$

phase shifter 530. In the case where the index of the input PT-RS occurs on an imaginary index after the $$\frac{\pi}{2}$$

phase shifter 530, the real interference on input PT-RS $p_{mn} \forall m, n$ is fixed to a value $d_{mn}$. The value of $d_{mn}$ is known to both transmitter and receiver. In this case, the auxiliary PT-RS symbols may depend on the pulse shape filter, data, input PT-RS, other auxiliary PT-RS symbols, $R_1$, and $R_2$.

Figure 12:
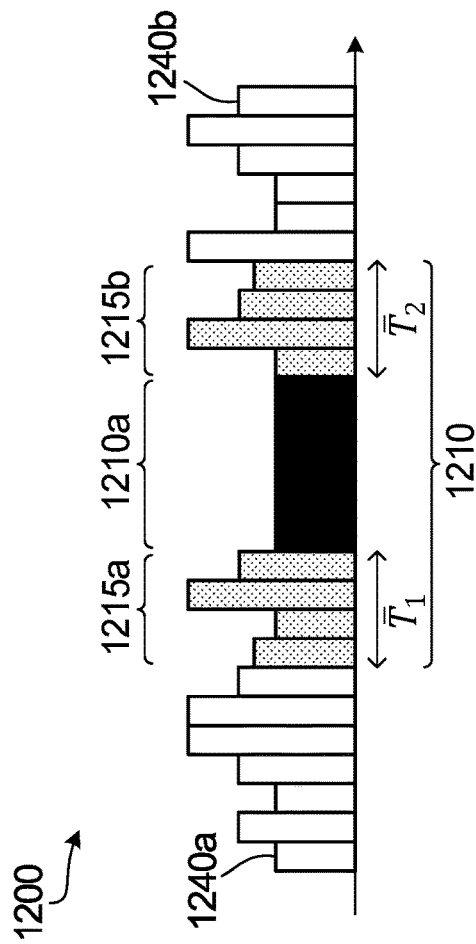
FIG. 12 illustrates a graphical plot of a multiplexed version of data and phase tracking reference signal of a SC-OQAM transmitter according to an embodiment of the present disclosure.

An example of this approach is shown for a multiplexed sequence in FIG. 12. FIG. 12 shows an example of a multiplexed time domain sequence 1200 of input and PT-RS symbols. This multiplexed sequence is an output of $$\frac{\pi}{2}$$

phase shifter 530. While not indicated in the multiplexed streams, the individual symbols are alternating real and imaginary symbols as the $$\frac{\pi}{2}$$

phase shifter 530 shifts every other symbol by $$\frac{\pi}{2}$$

resulting in a sequence of alternating real and imaginary valued symbols.

In FIG. 12, there is X=1 chunk having a chunk size K that is equal to 14. The single chunk 1210 includes V=1 block having a block size W that is equal to 6. The single block 1210a is comprised of 6 (i.e. W=6) input PT-RS symbols. In the example of FIG. 12, there are no input data symbols in the chunk. There are Y=2 portions 1240a and 1240b of the input data sequence shown in the multiplexed time domain sequence 1200. In FIG. 12, there are two portions 1215a and 1215b each including four auxiliary PT-RS symbols ($T_1$=4 and $T_2$=4) located at each end of the block of input PT-RS symbols 1210a. The input PT-RS symbols 1210a are shown as dark grey columns, the auxiliary PT-RS symbols are shown in medium grey columns, and the data is shown as light grey columns.

One of the features of embodiments in which auxiliary PT-RS symbols are used at the ends of the PT-RS symbols, with no data symbols in the chunk, is that due to auxiliary PT-RS symbols acting as guard symbols for the input PT-RS symbols, interference from data on the input PT-RS symbols is mitigated.

The received usable PT-RS symbols, which are the PT-RS symbols at the receiver, are different from the input PT-RS symbols at the transmitter as there may be interference from other PT-RS symbols and auxiliary PT-RS symbols.

In embodiments where the values of the auxiliary PT-RS symbols are fixed and do not depend on the data, the $m^{th}$ usable PT-RS symbol in the $n^{th}$ PT-RS chunk is given by $$\overline{p}_{mn} = \sum_{l=m-T_1}^{m+T_2} f_{l-m} v_{ln}, \forall m \in \{T_1+1, T_1+2, \ldots, K-T_2-1, K-T_2\}$$

The value of $\overline{p}_{mn}$ is a function of the pulse shape, the input PT-RS, the auxiliary PT-RS, and the constants $R_1$ and $R_2$. In the case where the pulse shape, the input PT-RS, auxiliary PT-RS, $R_1$, and $R_2$ are fixed, the $\overline{p}_{mn}$ is fixed. In such a case, $\overline{p}_{mn}$ is specified at the receiver as the usable PT-RS symbol for estimation.

In some embodiments, it may also be possible that several combinations of pulse shape, input PT-RS, auxiliary PT-RS, and the constants $R_1$ and $R_2$ are specified. In such a case, several different values of $\overline{p}_{mn}$ maybe known at the receiver and the transmitter may indicate the which combination of values is to be used through high layer signaling configuration.

In some embodiments, the receiver may also calculate $\overline{p}_{mn}$ if it knows the pulse shape, the input PT-RS, the auxiliary PT-RS, and $R_1$ and $R_2$.

In embodiments where the auxiliary PT-RS is set to values such that the interference on the input PT-RS is fixed to a constant, the usable PT-RS is $$\overline{p}_{mn} = p_{mn} \pm id_{mn}, \forall m \in \{T_1+1, T_1+2, \ldots, K-T_2-1, K-T_2\}.$$

In some embodiments, $\overline{p}_{mn}$ is specified at the receiver. In some other embodiments, few different values of $\overline{p}_{mn}$ are specified at the receiver and transmitter may indicate the desired $\overline{p}_{mn}$ via higher layer configurations.

A receiver configured to use the multiplexed signal described above can include similar functional components to the receiver shown in FIG. 11. When performing the phase error estimation, the received usable PT-RS symbols can be $\hat{p}_{mn}$ and corresponding usable PT-RS symbol can be $\overline{p}_{mn}$. The phase error is estimated at this particular symbol location as $$PE_{mn} = \arg\left(\frac{\hat{p}_{mn}}{\overline{p}_{mn}}\right).$$

It should be understood that other methods can be used to estimate phase error than the above mentioned approach by using $\overline{p}_{mn}$ and $\hat{p}_{mn}$. Once the phase error estimator estimates the phase error at all the usable PT-RS locations, the phase error estimator uses an interpolation method to estimate phase error at data locations. This interpolation can be a simple average, linear interpolation, same value as the closest phase error estimation, or any other method.

When performing the phase error correction, the phase error corrector uses the estimated phase error to correct the phase error of the data points. In some embodiments, a simple approach is to divide the received data symbol by the estimated phase error to remove the phase error in the received signal. In other embodiments, other methods can be used to correct phase errors using the estimated phase errors.

Several special case embodiments will now be described in detailed.

In one special case embodiment, a pulse filter length is equal to 3. An example of such a pulse filter is a raised Cosine pulse with roll-off factor 1. In such cases, only two auxiliary PT-RS symbols are used per any sized PT-RS chunk. The two auxiliary PT-RS symbols are placed at the left edge and right edge of the input PT-RS symbol block. This is shown in the example multiplexed sequence of FIG. 13.

Figure 13:
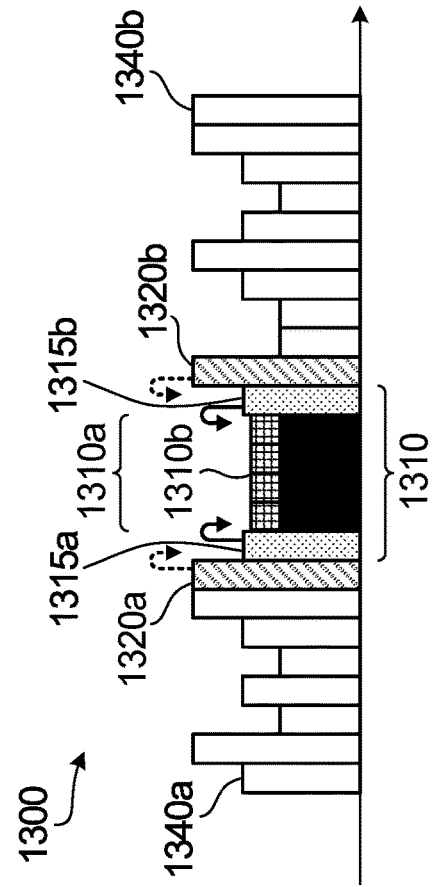
FIG. 13 illustrates a graphical plot of a multiplexed version of data and phase tracking reference signal of a SC-OQAM transmitter according to an embodiment of the present disclosure.

FIG. 13 shows an example of a multiplexed time domain sequence 1300 of input and PT-RS that also shows how interference occurs in the multiplexed time domain sequence 1300 due to the FDSS, and in particular what is observed after the M-point IDFT 1140 of FIG. 11. While not indicated in the multiplexed streams, the individual symbols are alternating real and imaginary symbols as the $$\frac{\pi}{2}$$

phase shifter 530 shifts every symbol by $$\frac{\pi}{2}$$

resulting in a sequence of alternating real and imaginary valued symbols.

In FIG. 13, there is X=1 chunk having a chunk size K that is equal to 6. The single chunk 1310 includes V=1 block having a block size W that is equal to 4. The one block 1310*a* is comprised of 4 (i.e. W=4) PT-RS symbols. In the example of FIG. 13, there are no input data symbols in the chunk. There are Y=2 portions 1340*a* and 1340*b* of the input data sequence shown in the multiplexed time domain sequence 1300. In FIG. 13, there are two portions 1315*a* and 1315*b*, each including one auxiliary PT-RS symbol ($T_1$=1 and $T_2$=1) located at each end of the block of input PT-RS symbols 1310. The input PT-RS symbols are shown as dark grey columns, the auxiliary PT-RS symbols are shown in medium grey columns, and the data symbols are shown in light grey columns.

In FIG. 13, the columns 1320*a* and 1320*b* represent data symbols which cause interference on the adjacent auxiliary PT-RS symbols 1315*a* and 1315*b*, respectively. However, these data symbols will not cause interference on the input PT-RS symbols. The interference 1310*b* from input PT-RS symbols or auxiliary PT-RS symbols, or both, is shown in grid pattern crosshatch superimposed above the input PT-RS symbols in block 1310*a*. This interference 1310*b* is known at the receiver based on the receiver being provided information about the input PT-RS symbols, auxiliary PT-RS symbols, and pulse shape filter parameters. The combination of the black and grid pattern crosshatch together creates the usable PT-RS symbols.

While the example of FIG. 13 is based on a configuration for a pulse shape filter of length 3, it should be understood that pulse shape filters of other length may be used. For such cases, $T_1$=1 and $T_2$=1.

For embodiments where interference is known at the receiver, the phase noise on the SC-OQAM waveform can be estimated. This can result in a significant BLER performance gain through the correction of phase noise. The proposed approach does not increase the PAPR, which makes it suitable for SC-OQAM.

A particular benefit for embodiments where interference is known at the receiver is that the auxiliary PT-RS symbols are not dependent on the data symbols.

Furthermore, it can be relatively easy to achieve a large block of consecutive input PT-RS symbols.

In some embodiments, an alternative PT-RS method involves the auxiliary PT-RS symbols being set to zero and located around the input PT-RS symbols to mitigate interference on the input PT-RS symbols.

When performing the multiplexing of the PT-RS, $p_{mn}$ can be the $m^{th}$ resultant PT-RS symbol of the $n^{th}$ PT-RS chunk, where $m \in \{1, 2, \ldots, K\}$ and $n \in \{1, 2, \ldots, X\}$. That means resultant PT-RS symbols consist of input PT-RS symbols and auxiliary PT-RS symbols inside the $n^{th}$ PT-RS chunk. The number of resultant PT-RS symbols in the $n^{th}$ PT-RS chunk is $S_n$=K.

Let $\overline{T}_1 = T_1 - R_1$ and $\overline{T}_2 = T_2 - R_2$ where $0 \leq R_1 \leq T_1$ and $0 \leq R_2 \leq T_2$ are constants. The input PT-RS symbols are located $\overline{T}_{max} = \max(\overline{T}_1, \overline{T}_2)$ symbols apart. The input PT-RS symbols can be placed at $m \in \varepsilon_n$ where $$\varepsilon_n = \overline{T}_1 + 1 + l(\overline{T}_{max} + 1), \forall l \in \left\{ 0, 1, \ldots, \left\lfloor \frac{K - \overline{T}_1 - \overline{T}_2 - 1}{\overline{T}_{max} + 1} \right\rfloor \right\}.$$

When the value of $$\frac{K - \overline{T}_1 - \overline{T}_2 - 1}{\overline{T}_{max} + 1}$$

is an integer value it results in the best spectral efficiency. The number of input PT-RS symbols is $$|\varepsilon_n| = \left\lfloor \frac{K - \overline{T}_1 - \overline{T}_2 - 1}{\overline{T}_{max} + 1} \right\rfloor + 1.$$

Let $\overline{\varepsilon}_n$ be the compliment of $\varepsilon_n$ such that $\varepsilon_n \cup \overline{\varepsilon}_n \in \{1, 2, \ldots, K\}$ and $\varepsilon_n \cup \overline{\varepsilon}_n \in \phi$ (null set). The auxiliary PT-RS symbols are placed at $m \in \overline{\varepsilon}_n$ and set to zero so that there is substantially no interference on input PT-RS symbols. Let $\{q_{1n}, q_{2n}, \ldots, q_{L_n n}\} \subset \{q_1, q_2, \ldots, q_L\}$ be the $L_n$ length input PT-RS sequence for the $n^{th}$ PT-RS chunk. Then, the resultant PT-RS symbols are given by $$P_{mn} = \begin{cases} q_{mn}, & m \in \varepsilon_n \\ 0, & m \in \overline{\varepsilon}_n \end{cases}.$$

In some embodiments, some of the elements of the pulse shape filter are equal to zero. In such embodiments, there is no advantage to allocate zeros on these locations relative to the input PT-RS symbol locations. If $f_{j'} = 0$ for $\mathcal{T} \subset \{-T_1, -T_1+1, \ldots, -1, 0, 1, \ldots, T_2\}$, then for each $m \in \varepsilon_n$ there is no advantage to allocate zero valued symbols at $m - \mathcal{T}$ locations as the symbols at these locations do not cause interference. In some embodiments, data symbols may be allocated on these zero valued locations.

Such an approach mitigates interference on the input PT-RS symbols. Therefore, the usable PT-RS symbols at the receiver are the same as the input PT-RS symbols from the transmitter. An example of this is shown in FIG. 14.

Figure 14:
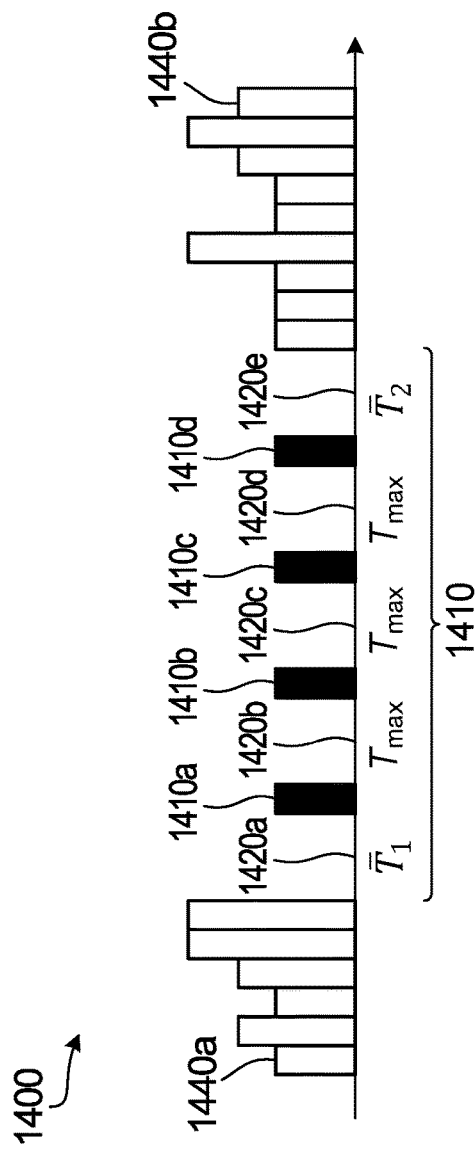
FIG. 14 illustrates a graphical plot of a multiplexed version of data and phase tracking reference signal of a SC-OQAM transmitter according to an embodiment of the present disclosure.

FIG. 14 shows an example of a multiplexed time domain sequence 1400 of input and PT-RS symbols. This multiplexed sequence is an output of $$\frac{\pi}{2}$$

phase shifter 530. While not indicated in the multiplexed streams, the individual symbols are alternating real and imaginary symbols as the $$\frac{\pi}{2}$$

phase shifter 530 shifts every symbol by $$\frac{\pi}{2}$$

resulting in a sequence of alternating real and imaginary valued symbols.

In FIG. 14, there is X=1 chunk having a chunk size K that is equal to 14. The single chunk 1410 includes V=4 blocks, where each block has a size W that is equal to 1. The four blocks 1410*a*, 1410*b*, 1410*c*, and 1410*d*, are each comprised of 1 (i.e. W=1) PT-RS symbol. In the example of FIG. 14, there are no input data symbols in the chunk. There are Y=2 portions 1440*a* and 1440*b* of the input data sequence in the portion shown of the multiplexed sequence 1400. In FIG. 14, there are 5 pairs of auxiliary PT-RS symbols 1420*a*, 1420*b*, 1420*c*, 1420*d*, and 1420*e* ($\overline{T}_1$=2, $\overline{T}_2$=2 and $\overline{T}_{max}$=2). The $\overline{T}_1$ and $\overline{T}_2$ auxiliary PT-RS symbols 1420a and 1420e are located at each end of the block of four input PT-RS symbols 1410a-1410d and $T_{max}$ auxiliary PT-RS symbols 1420b, 1420c and 1420d separate the four input PT-RS symbols. The input PT-RS symbols are shown as dark grey columns, the auxiliary PT-RS symbols located at either end of the four input PT-RS symbols and between the four input PT-RS symbols are zero values and therefore appear as gaps in the symbol stream, and the data symbols are shown as light grey columns.

A receiver configured to use the multiplexed signal described above can include similar functional components to the receiver shown in FIG. 11. When performing the phase error estimation, the received usable PT-RS symbols can be $\hat{p}_{mn}$ and corresponding usable PT-RS symbols can be $p_{mn}$. The phase error is estimated at this particular symbol location in the form $$PE_{mn} = \arg\left(\frac{\hat{p}_{mn}}{p_{mn}}\right).$$

It should be understood that other methods can be used to estimate phase error than the above mentioned approach by using $p_{mn}$ and $\hat{p}_{mn}$. Once the phase error estimator estimates the phase error at all the usable PT-RS locations, the phase error estimator uses an interpolation method to estimate phase error at data locations. This interpolation can be a simple average, linear interpolation, same value as the closest phase error estimation, or any other method.

When performing the phase error correction, the phase error corrector uses the estimated phase error to correct the phase error of the data points. In some embodiments, a simple approach is to divide the received data symbol by the estimated phase error to remove the phase error in the received signal. In other embodiments, other methods can be used to correct phase errors using the estimated phase errors.

Several special case embodiments will now be described in detailed.

In one special case embodiment, a pulse filter length is equal to 3. An example of such a pulse filter is a raised Cosine pulse with roll-off factor 1. In such a case, there are only two auxiliary PT-RS symbols used per input PT-RS symbol, which are placed at left edge or right side edge, or both. An example of this is shown in FIG. 15.

Figure 15:
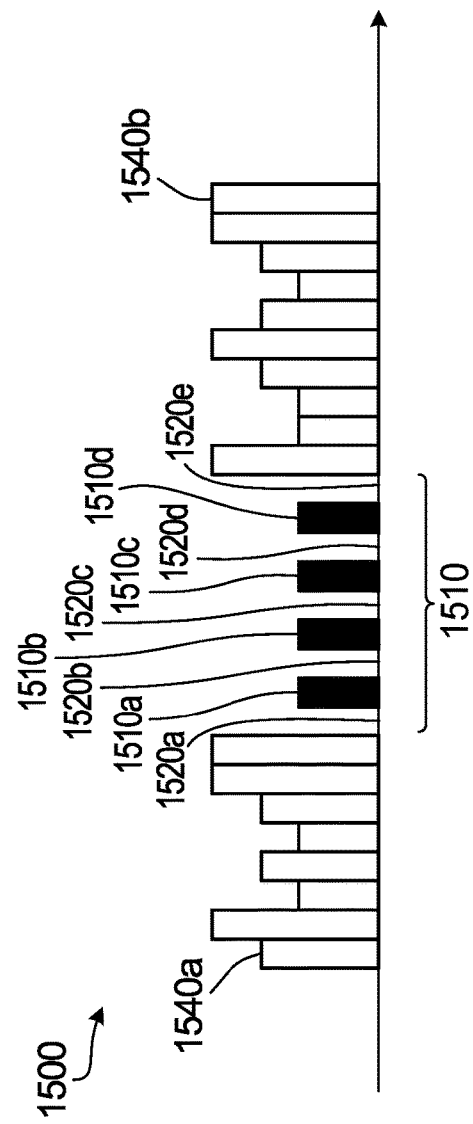
FIG. 15 illustrates a graphical plot of a multiplexed version of data and phase tracking reference signal of a SC-OQAM transmitter according to an embodiment of the present disclosure.

FIG. 15 shows an example of a multiplexed time domain sequence 1500 of input and PT-RS. In FIG. 15, there is X=1 chunk having a chunk size K that is equal to 9. The single chunk 1510 includes V=4 blocks and having a block size W that is equal to 1. The four blocks 1510a, 1510b, 1510c, and 1510d are each comprised of 1 (i.e. W=1) PT-RS symbol. In the example of FIG. 15, there are no input data symbols in the chunk. There are Y=2 portions 1540a and 1540b of the input data sequence in the portion shown of the multiplexed sequence 1500. In FIG. 15, there are 5 auxiliary PT-RS symbols 1520a, 1520b, 1520c, 1520d, and 1520e. Auxiliary PT-RS symbols are located on each end of the block of four input PT-RS symbols and in between the four input PT-RS symbols. The input PT-RS symbols are shown as dark grey columns, the auxiliary PT-RS symbols located on either end of the four input PT-RS symbols and between the four input PT-RS symbols are zero values and therefore appear as gaps in the symbol stream, and the data symbols are shown as light grey columns.

Figure 16:
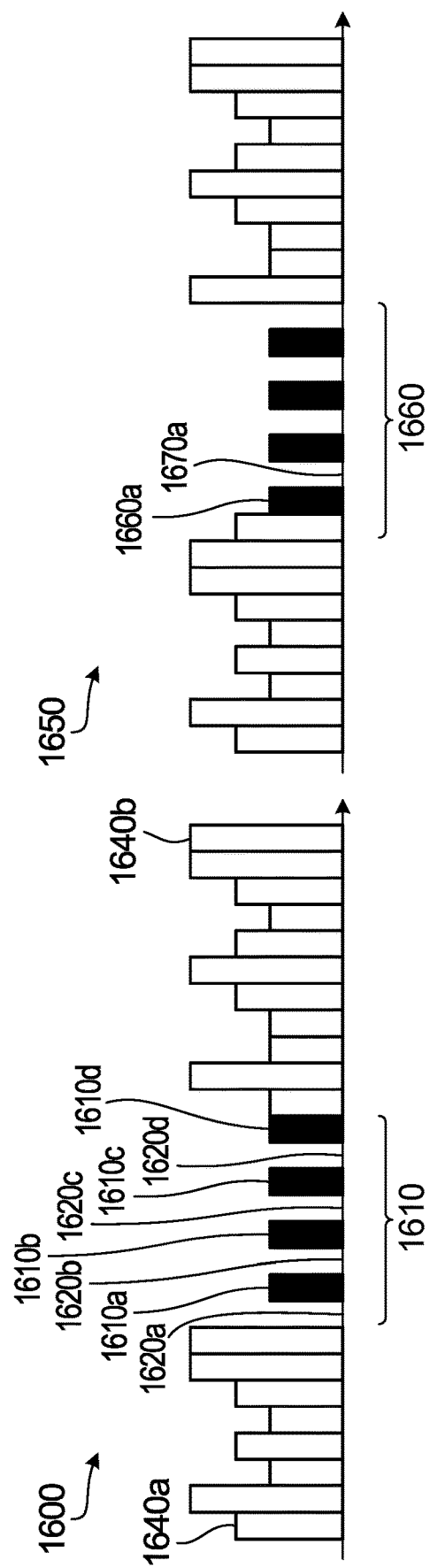
FIG. 16 illustrates two graphical plots of multiplexed versions of data and phase tracking reference signal of a SC-OQAM transmitter according to embodiments of the present disclosure.

In another special case embodiment, the pulse filter length is equal to 2. An example is a 1+D filter where $f_{-1}=1$ and $f_0=1$. In such cases, there is only one auxiliary PT-RS symbol, which is placed on either the left side (if $f_{-1}$ is non-zero) or the right side (if $f_1$ is non-zero) based on the non-zero filter coefficient location. FIG. 16 illustrates two examples of multiplexed sequences 1600 and 1650. when the first auxiliary PT-RS symbol is on the left of the first input PT-RS symbol in the chunk and when the first auxiliary PT-RS symbol is on the right of the first input PT-RS symbol in the chunk.

In FIG. 16, in multiplexed time domain sequence 1600 there is X=1 chunk having a chunk size K that is equal to 8. The single chunk 1610 includes V=4 blocks where each block size W is equal to 1. The four blocks 1610a, 1610b, 1610c, and 1610d are each comprised of 1 (i.e. W=1) PT-RS symbol. In the example of FIG. 16, there are no input data symbols in the chunk. There are Y=2 portions 1640a and 1640b of the input data sequence in the portion shown of the multiplexed sequence 1600. In FIG. 16, there are 4 auxiliary PT-RS symbols 1620a, 1620b, 1620c, and 1620d. The auxiliary PT-RS symbols are located at the left end of the block of four input PT-RS symbols and in between the four input PT-RS symbols. The input PT-RS symbols are shown as dark grey columns, the auxiliary PT-RS symbols located at the left end of the four input PT-RS symbols and between the four input PT-RS symbols are zero values and therefore appear as gaps in the symbol stream, and the data symbols are shown as light grey columns. A similar scenario can be seen with multiplexed sequence 1650, except the auxiliary PT-RS symbol 1670a is after the first input PT-RS symbol 1660a in chunk 1660.

For embodiments where the auxiliary PT-RS symbols are set to zero and located around the input PT-RS symbols to mitigate interference on the input PT-RS symbols, the phase noise on SC-OQAM waveform can be estimated. This can result in a significant BLER performance gain through the correction of phase noise. The proposed approach does not increase the PAPR, which is therefore suitable for SC-OQAM.

A particular benefit for embodiments where interference is known at the receiver is that the auxiliary PT-RS symbols are not dependent on the data symbols.

Furthermore, implementing this type of methodology can be relatively easy to implement. The usable PT-RS symbols are not pulse or data dependent.

Figure 17A:
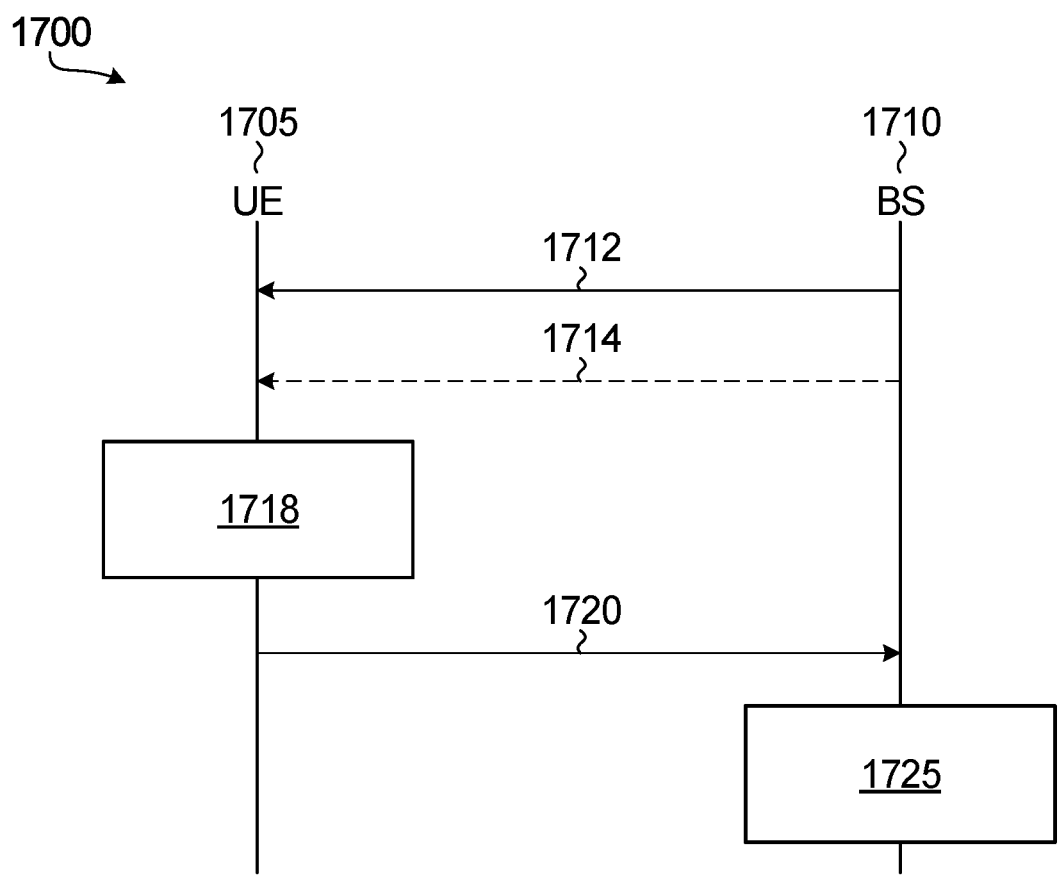
FIGS. 17A, 17B and 17C are examples of signaling flow diagrams for UL, DL and SL communications, respectively, that utilize a phase tracking reference signal to enable estimation and compensation of phase noise.
Figure 17B:
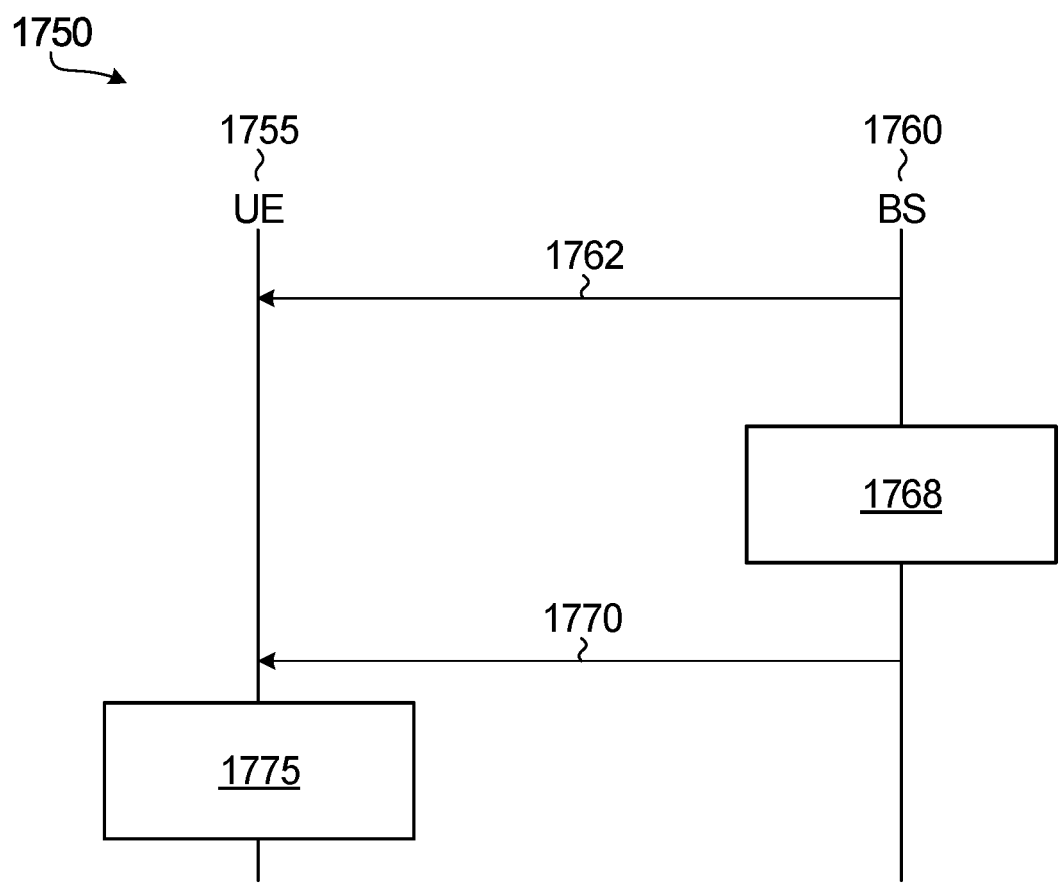
Figure 17C:
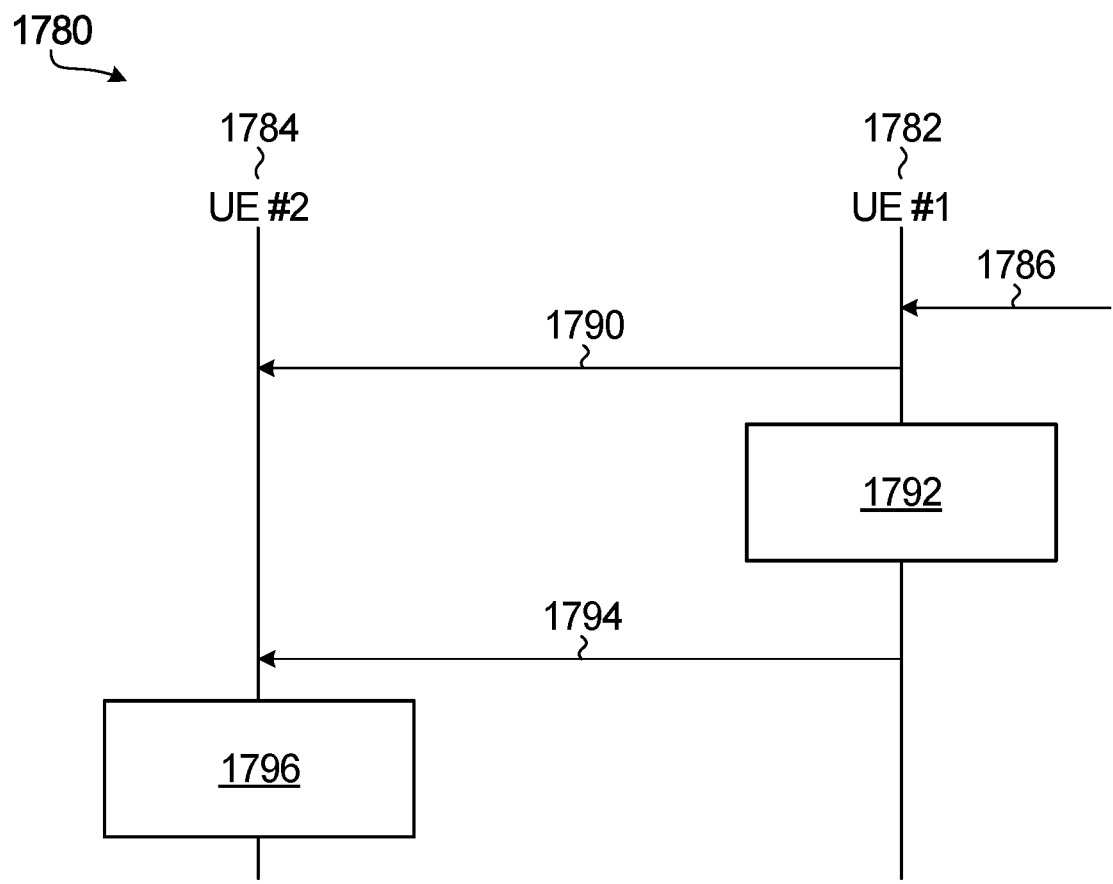

FIGS. 17A, 17B and 17C illustrate three signaling flow diagrams between a transmitter and a receiver. In the scenario of an uplink (UL) communication 1700 in FIG. 17A, the transmitter is a UE 1705 and the receiver is a base station (BS) 1710. In the scenario of a downlink (DL) communication 1750 in FIG. 17B, the transmitter is a base station 1760 and the receiver is a UE 1755. In the scenario of a sidelink (SL) communication 1780 in FIG. 17C, the transmitter is a first UE 1782 and the receiver is a second UE 1784.

Referring to FIG. 17A, step 1712 involves the UE 1705 receiving configuration information to enable the UE 1705 to multiplex a PT-RS with a data signal. The resulting multiplexed PT-RS and data signal enables detection of phase noise in a transmitted SC-OQAM signal. The configuration information is shown to be coming from the base station 1710.

In some embodiments, the configuration may contain one or more of: an indication of a type of multiplexing for incorporating the PT-RS in the data signal; a size of the chunks, K, in the multiplexed stream of M symbols expressed in a number of PT-RS symbol; a number of the chunks, X, in the multiplexed stream of M symbols; a number of blocks, V, in a chunk; a number of adjacent PT-RS symbols per block, W; an indication of a density of PT-RS symbols over a plurality of SC-OQAM symbols; and a phase tracking reference signal sequence type. This configuration information may be sent together in a single messaging signal, or may be sent in two or more messaging signals. For example a first high layer message may be an indication of a type of multiplexing for incorporating the PT-RS in the data signal and a second high layer message may be one or more of: a size of the chunks, K, in the multiplexed stream of M symbols expressed in a number of PT-RS symbol; a number of the chunks, X, in the multiplexed stream of M symbols; a number of blocks, V, in a chunk; a number of adjacent PT-RS symbols per block, W; an indication of a density of PT-RS symbols over a plurality of SC-OQAM symbols; and a phase tracking reference signal sequence type.

In some embodiments, a lookup table could be used to provide some of the configuration information where each entry in the table has an associated index value, and the entry has set values for one or more of the variables in the preceding paragraph. Then the index can be forwarded as a configuration value. As an example, there may be four different entries, each having a respective combination of configuration values. The base station can then send one of the four entries using only two bits.

In some embodiments, the configuration information may indicate a particular type of multiplexing to be used for a particular set of resource blocks (RBs) and a different type of multiplexing to be used for a different set of RBs.

The base station 1710 may optionally, at step 1714, send an uplink grant to the UE 1705, for the UE 1705 to transmit an UL signal to the base station 1710.

At step 1718, the UE 1705 multiplexes a PT-RS with a data signal based on the configuration information received in message 1712 to obtain a multiplexed signal and then generates an SC-OQAM signal that includes the multiplexed PT-RS and data signal. The SC-OQAM signal may be generated based on the various embodiments described above for multiplexing the PT-RS sequence and the data signal.

At step 1720, the UE 1705 transmits the generated SC-OQAM signal comprising the multiplexed PT-RS and the data signal. The SC-OQAM signal may be transmitted on the uplink grant provided in optional step 1714.

At step 1725, the base station 1710 receives the SC-OQAM signal and uses the PT-RS component to estimate a phase noise component and compensate for the phase noise component. Estimating of the phase noise component and compensating for the phase noise component may be based on the various embodiments described above.

Referring to FIG. 17B, step 1762 involves the base station 1760 providing configuration information to the UE 1755 regarding how the base station 1760 will be multiplexing a PT-RS with a data signal so that the UE 1755 can receive and decode a DL signal from the base station 1760. The configuration may contain one or more of: an indication of possible types of multiplexing for incorporating the PT-RS in the data signal; an indication of a type of multiplexing for incorporating the PT-RS in the data signal; a size of the chunks, K, in the multiplexed stream of M symbols expressed in a number of PT-RS symbol; a number of the chunks, X, in the multiplexed stream of M symbols; a number of blocks, V, in a chunk; a number of adjacent PT-RS symbols per block, W; an indication of a density of PT-RS symbols over a plurality of SC-OQAM symbols; and a phase tracking reference signal sequence type.

This configuration information may be sent together in a single messaging signal, or may be sent in two or more messaging signals. For example a first high layer message may be an indication of an indication of possible types of multiplexing for incorporating the PT-RS in the data signal and a second high layer message may be one or more of: the type of multiplexing being used for incorporating the PT-RS in the data signal, a size of the chunks, K, in the multiplexed stream of M symbols expressed in a number of PT-RS symbol; a number of the chunks, X, in the multiplexed stream of M symbols; a number of blocks, V, in a chunk; a number of adjacent PT-RS symbols per block, W; an indication of a density of PT-RS symbols over a plurality of SC-OQAM symbols; and a phase tracking reference signal sequence type.

At step 1768, the base station 1760 multiplexes a PT-RS with a data signal based on the configuration information sent in message 1762 to obtain a multiplexed signal and then generates an SC-OQAM signal that includes the multiplexed PT-RS and the data signal. The SC-OQAM signal may be generated based on the various embodiments described above for multiplexing the PT-RS sequence and the data signal.

At step 1770, the base station 1760 transmits the generated SC-OQAM signal comprising the multiplexed PT-RS and the data signal.

At step 1775, the UE 1755 receives the SC-OQAM signal and uses the PT-RS component to estimate a phase noise component and compensate for the phase noise component. Estimating of the phase noise component and compensating for the phase noise component may be based on the various embodiments described above.

Referring to FIG. 17C, step 1786 involves a UE #1 1782 receiving configuration information to enable UE #1 1782 to multiplex a PT-RS with a data signal. The resulting multiplexed PT-RS and data signal enables detection of phase noise in a transmitted SC-OQAM signal. The configuration information is received from a network that UE #1 1782 is being served by. The configuration information may be received from a base station that is part of the network serving UE #1 1782.

Step 1785 involves UE #1 1782 providing configuration information to a second UE #2 1784 regarding how UE #1 1782 will be multiplexing a PT-RS with a data signal so that UE #2 1784 can receive and decode a DL signal from UE #1 1782. The configuration may contain one or more of: an indication of possible types of multiplexing for incorporating the PT-RS in the data signal; an indication of a type of multiplexing for incorporating the PT-RS in the data signal; a size of the chunks, K, in the multiplexed stream of M symbols expressed in a number of PT-RS symbol; a number of the chunks, X, in the multiplexed stream of M symbols; a number of blocks, V, in a chunk; a number of adjacent PT-RS symbols per block, W; an indication of a density of PT-RS symbols over a plurality of SC-OQAM symbols; and a phase tracking reference signal sequence type.

This configuration information may be sent together in a single messaging signal, or may be sent in two or more messaging signals. For example a first high layer message may be an indication of a type of multiplexing for incorporating the PT-RS in the data signal and a second high layer message may be one or more of: a size of the chunks, K, in the multiplexed stream of M symbols expressed in a number of PT-RS symbol; a number of the chunks, X, in the multiplexed stream of M symbols; a number of blocks, V, in a chunk; a number of adjacent PT-RS symbols per block, W;

an indication of a density of PT-RS symbols over a plurality of SC-OQAM symbols; and a phase tracking reference signal sequence type.

At step 1792, UE #1 1782 multiplexes a PT-RS with a data signal based on the configuration information sent in message 1790 to obtain a multiplexed signal and then generates an SC-OQAM signal that includes the multiplexed PT-RS and data signal. The SC-OQAM signal may be generated based on the various embodiments described above for multiplexing the PT-RS sequence and the data signal.

At step 1794, UE #1 1782 transmits the generated SC-OQAM signal comprising the multiplexed PT-RS and the data signal.

At step 1796, UE #2 1784 receives the SC-OQAM signal and uses the PT-RS component to estimate a phase noise component and compensate for the phase noise component. Estimating of the phase noise component and compensating for the phase noise component may be based on the various embodiments described above.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
receiving configuration information;
multiplexing a phase tracking reference signal (PT-RS) with a data signal based on the configuration information to obtain a multiplexed signal by multiplexing L PT-RS symbols and S-L auxiliary PT-RS symbols with M-S data symbols thereby obtaining the multiplexed signal including a multiplexed stream of M symbols, wherein M, L and S are integer values;

generating a single carrier orthogonal quadrature amplitude modulation (SC-OQAM) signal based on the multiplexed stream of M symbols; and
transmitting the SC-OQAM signal.

2. The method of claim 1, wherein:
the L PT-RS symbols, the S-L auxiliary PT-RS symbols and the M-S data symbols are all real valued symbols; or
the L PT-RS symbols, the S-L auxiliary PT-RS symbols and the M-S data symbols are all imaginary valued symbols.

3. The method of claim 1, wherein the multiplexing the PT-RS with the data signal comprises:
multiplexing the L PT-RS symbols and the S-L auxiliary PT-RS symbols with the M-S data symbols by multiplexing chunks of at least one of PT-RS symbols and auxiliary PT-RS symbols with chunks of data symbols and generating the multiplexed stream of M symbols, wherein:
X≥1 is a number of chunks of PT-RS symbols in the multiplexed stream of M symbols, where X is an integer value;
K≥1 is a size of a chunk of PT-RS symbols in the multiplexed stream of M symbols that includes V blocks of PT-RS symbols, wherein each of the V blocks includes W adjacent PT-RS symbols, where K, V, W are integer values; and
Y≤X+1 is a number of chunks of data symbols, where Y is an integer value.

4. The method of claim 3, wherein the configuration information includes one or more of:
an indication of different types of multiplexing for incorporating the PT-RS in the data signal;
an indication of a selected type of multiplexing for incorporating the PT-RS in the data signal;
a size of the chunks, K, in the multiplexed stream of M symbols expressed in a number of PT-RS symbols;
a number of the chunks, X, in the multiplexed signal including the stream of M symbols;
a number of blocks, V, in a chunk;
a number of adjacent PT-RS symbols per block, W;
an indication of a density of PT-RS symbols over a plurality of SC-OQAM symbols that comprise the SC-OQAM signal;
a pulse filter type;
a pulse type; and
a phase tracking reference signal sequence type.

5. The method of claim 1, wherein multiplexing the PT-RS with the data signal comprises:
multiplexing at least one auxiliary PT-RS symbol prior to at least one PT-RS symbol or at least one auxiliary PT-RS symbol subsequent to at least one PT-RS symbol, or both, wherein the at least one auxiliary PT-RS symbol separates the at least one PT-RS symbol from the data symbols; or
multiplexing at least one zero value auxiliary PT-RS symbol prior to at least one PT-RS symbol or at least one zero value auxiliary PT-RS symbol subsequent to at least one PT-RS symbol, or both, wherein the at least one zero value auxiliary PT-RS symbol separates the at least one PT-RS symbol from the data symbols.

6. The method of claim 5, wherein when multiplexing at least one auxiliary PT-RS symbol prior to at least one PT-RS symbol or at least one auxiliary PT-RS symbol subsequent to at least one PT-RS symbol, or both, wherein the at least one auxiliary PT-RS symbol separates the at least one PT-RS symbol from the data symbols, and wherein interference on the at least one PT-RS symbol is set to a fixed value.

7. The method of claim 5, wherein the at least one PT-RS symbol is at least two PT-RS symbols and in addition to the at least one zero valued auxiliary PT-RS symbol prior to the at least two PT-RS symbols, or the at least one zero valued auxiliary PT-RS symbol subsequent to the at least two PT-RS symbols, or both, there are zero valued auxiliary PT-RS symbols between the at least two PT-RS symbols.

8. An apparatus comprising:
a processor; and
a computer-readable media having stored thereon computer executable instructions that when executed cause the apparatus to:
receive configuration information;
multiplex a phase tracking reference signal (PT-RS) with a data signal based on the configuration information to obtain a multiplexed signal by multiplexing L PT-RS symbols and S-L auxiliary PT-RS symbols with M-S data symbols thereby obtaining the multiplexed signal including a stream of M symbols, wherein M, L and S are integer values;
generate a single carrier orthogonal quadrature amplitude modulation (SC-OQAM) signal based on the stream of M symbols; and
transmit the SC-OQAM signal.

9. The apparatus of claim 8, wherein:
the L PT-RS symbols, the S-L auxiliary PT-RS symbols and the M-S data symbols are all real valued symbols; or
the L PT-RS symbols, the S-L auxiliary PT-RS symbols and the M-S data symbols are all imaginary valued symbols.

10. The apparatus of claim 8, wherein the computer executable instructions causing the apparatus to multiplex the PT-RS with the data signal comprise computer executable instructions to:
multiplex the L PT-RS symbols and the S-L auxiliary PT-RS symbols with the M-S data symbols by multiplexing chunks of at least one of PT-RS symbols and auxiliary PT-RS symbols with chunks of data symbols and generating the multiplexed signal including the stream of M symbols, wherein:
$X \geq 1$ is a number of chunks of PT-RS symbols in the stream of M symbols, where X is an integer value;
$K \geq 1$ is a size of a chunk of PT-RS symbols in the stream of M symbols that includes V blocks of PT-RS symbols, wherein each of the V blocks includes W adjacent PT-RS symbols, where K, V, W are integer values; and
$Y \leq X+1$ is a number of chunks of data symbols, where Y is an integer value.

11. A method comprising:
receiving a single carrier orthogonal quadrature amplitude modulation (SC-OQAM) signal generated from a multiplexed signal,
wherein the multiplexed signal has been obtained by multiplexing a phase tracking reference signal (PT-RS) and a data signal; and
estimating phase errors based on the SC-OQAM signal, wherein the received SC-OQAM signal comprises a plurality of SC-OQAM symbols, the SC-OQAM symbols comprising:
L PT-RS symbols, S-L auxiliary PT-RS symbols and M-S data symbols multiplexed together that are all real valued symbols or all imaginary valued symbols.

12. The method of claim 11 further comprising:
correcting the estimated phase errors in the received SC-OQAM signal; and
detecting the data signal.

13. The method of claim 11, wherein the received SC-OQAM signal comprises:
the L PT-RS symbols, the S-L auxiliary PT-RS symbols and the M-S data symbols, multiplexed in chunks of at least one of PT-RS symbols and auxiliary PT-RS symbols with chunks of data symbols, wherein:
$X \geq 1$ is a number of chunks of PT-RS symbols in the SC-OQAM signal, where X is an integer value;
$K \geq 1$ is a size of a chunk of PT-RS symbols in the SC-OQAM signal that includes V blocks of PT-RS symbols, wherein each of the V blocks includes W adjacent PT-RS symbols, where K, V, W are integer values; and
$Y \leq X+1$ is a number of chunks of data symbols, where Y is an integer value.

14. The method of claim 11, further comprising transmitting configuration information used to multiplex the PT-RS with the data signal to enable detection of phase errors in a transmitted SC-OQAM signal.

15. The method of claim 13, wherein the configuration information includes one or more of:
an indication of different types of multiplexing for incorporating the PT-RS in the data signal;
an indication of a selected type of multiplexing for incorporating the PT-RS in the data signal;
a size of the chunks, K, in the SC-OQAM signal expressed in a number of PT-RS symbols;
a number of the chunks, X, in the SC-OQAM signal;
a number of blocks, V, in a chunk;
a number of adjacent PT-RS symbols per block, W;
an indication of a density of PT-RS symbols over a plurality of SC-OQAM symbols;
a pulse filter type;
a pulse type; and
a phase tracking reference signal sequence type.

16. The method of claim 11, further comprising:
estimating expected values of received PT-RS symbols based on a knowledge of PT-RS symbols, auxiliary PT-RS symbols, and pulse shape filter parameters used at a transmitter; and
estimating phase errors in the received SC-OQAM signal based on the estimated expected values of the received PT-RS symbols.

17. An apparatus comprising:
a processor; and
a computer-readable media having stored thereon computer executable instructions, that when executed cause the apparatus to:
receive a single carrier orthogonal quadrature amplitude modulation (SC-OQAM) signal generated from a multiplexed signal, wherein the multiplexed signal has been obtained by multiplexing a phase tracking reference signal (PT-RS) and a data signal; and
estimate phase errors based on the received SC-OQAM signal,
wherein the received SC-OQAM signal comprises a plurality of SC-OQAM symbols, the SC-OQAM symbols comprising:
L PT-RS symbols, S-L auxiliary PT-RS symbols and M-S data symbols multiplexed together that are all real valued symbols or all imaginary valued symbols.

* * * * *